United States Patent
Hashimoto et al.

(10) Patent No.: US 8,270,085 B2
(45) Date of Patent: Sep. 18, 2012

(54) LENS ARRAY PLATE OF ERECTING UNIT MAGNIFICATION SYSTEM, IMAGE READING APPARATUS AND IMAGE WRITING APPARATUS USING THE LENS ARRAY PLATE, AS WELL AS METHOD FOR MANUFACTURING THE LENS ARRAY PLATE

(75) Inventors: Takahiro Hashimoto, Tokyo (JP); Hiroyuki Nemoto, Tokyo (JP)

(73) Assignee: Nippon Sheet Glass Company, Limited, Tokyo (JP)

( * ) Notice: Subject to any disclaimer, the term of this patent is extended or adjusted under 35 U.S.C. 154(b) by 680 days.

(21) Appl. No.: 12/374,268

(22) PCT Filed: Jul. 5, 2007

(86) PCT No.: PCT/JP2007/063489
§ 371 (c)(1),
(2), (4) Date: Jan. 16, 2009

(87) PCT Pub. No.: WO2008/010424
PCT Pub. Date: Jan. 24, 2008

(65) Prior Publication Data
US 2010/0014062 A1    Jan. 21, 2010

(30) Foreign Application Priority Data

Jul. 19, 2006  (JP) .................................. 2006-197166
Jul. 27, 2006  (JP) .................................. 2006-205248

(51) Int. Cl.
*G02B 27/10*  (2006.01)

(52) U.S. Cl. ........................................ 359/619; 359/622

(58) Field of Classification Search ................... 359/619
See application file for complete search history.

(56) References Cited

U.S. PATENT DOCUMENTS

| 7,187,501 B2 | 3/2007 | Wakisaka |
| 2003/0147143 A1 | 8/2003 | Toyama |
| 2006/0139759 A1* | 6/2006 | Hashimoto et al. ........... 359/619 |
| 2009/0231698 A1 | 9/2009 | Hashimoto et al. |

FOREIGN PATENT DOCUMENTS

| JP | 06-175500 A | 6/1994 |
| JP | 09-058052 A | 3/1997 |
| JP | 09-085985 A | 3/1997 |
| JP | 10-62717 A | 3/1998 |
| JP | 11-041410 A | 2/1999 |
| JP | 2000-066316 A | 3/2000 |
| JP | 2000-352606 A | 12/2000 |
| JP | 2001-322309 A | 11/2001 |
| JP | 2002-258019 A | 9/2002 |

(Continued)

*Primary Examiner* — James Jones
(74) *Attorney, Agent, or Firm* — Knobbe, Martens, Olson & Bear, LLP

(57) ABSTRACT

A lens array plate of long-size or large area is provided reducing deterioration of optical performance. A lengthy lens array plate (10), which is based on manufacturing process in accordance with the present invention, is formed by connecting a plurality of planar-shaped lens array plates (1) in the longer direction thereof, the planar-shaped lens array plate (1) including a plurality of lens portions that are regularly arranged. The connecting portion (3) is linearly formed at the position other than the plurality of lens portions. Thereby, a lengthy lens array plate with any length may be formed.

18 Claims, 15 Drawing Sheets

FOREIGN PATENT DOCUMENTS

| | | |
|---|---|---|
| JP | 3371017 B2 | 11/2002 |
| JP | 2003-215450 A | 7/2003 |
| JP | 2004-009655 A | 1/2004 |
| JP | 2004-209703 A | 7/2004 |
| JP | 2004-336201 A | 11/2004 |
| JP | 2005-037891 A | 2/2005 |

* cited by examiner

LENS ARRAY PLATE OF ERECTING UNIT MAGNIFICATION SYSTEM, IMAGE READING APPARATUS AND IMAGE WRITING APPARATUS USING THE LENS ARRAY PLATE, AS WELL AS METHOD FOR MANUFACTURING THE LENS ARRAY PLATE

This application is U.S. National Phase of International Application PCT/JP2007/063489, filed Jul. 5, 2007 designating the U.S., and published in Japanese as WO 2008/010424 on Jan. 24, 2008, which claims priority to Japanese Patent Applications Nos. 2006-197166 and 2006-205248, filed Jul. 19, 2006 and Jul. 27, 2006, respectively.

TECHNICAL FIELD

The present invention relates to a lens array plate of an erecting unit magnification system, an image reading apparatus and an image writing apparatus using the lens array plate, as well as a method for manufacturing the lens array plate, and particularly relates to a lengthy lens array plate.

RELATED ART

For a prior art, a planar-shaped lens array plate is known as a lens array of an erecting unit magnification system that is used for an image reading apparatus and an image writing apparatus (for example, it is disclosed in a patent document 1, Japanese Patent Application Laid-Open No. 2005-37,891). The planar-shaped lens array plate may be a resin material, and, for example, may be formed by an injection molding method.

FIGS. 22A and 22B show schematic diagrams of a lens array plate of an erecting unit magnification system that is used for an image reading apparatus and an image writing apparatus, respectively. FIG. 22A is a perspective view showing an example of a lens array plate of an erecting unit magnification system in which the lens array plate is arranged by stacking two lens array plates so that the optical axis of the lens portion of each lens array plate at the upper and lower is coaxial. When the lens array plate of an erecting unit magnification system is used for the image reading apparatus or the image writing apparatus, the lens array plate of the erecting unit magnification system is generally arranged so that two planar-shaped lens array plates 501, on which a plurality of lens portions 502 are formed, are stacked as shown in FIG. 22A.

FIG. 22B is a perspective view showing an example of a rod-lens array that is provided as a lens array of the erecting unit magnification system. As shown in FIG. 22B, the rod lens array is used for the lens array of the erecting unit magnification system in different manner, relative to providing the lens array of the erecting unit magnification system with the planar-shaped lens-array plate. The lens array of erecting unit magnification system using the rod lens array 401 in which a plurality of lens portions 402 are formed is known (for example, it is disclosed in a patent document 2, Japanese Patent Application Laid-Open No. 1997-85,985).

Now, an example of an erecting unit magnification lens array using the planar-shaped lens array plate is further described. FIGS. 23A and 23B are a schematic view of an optical system of a lens array plate of an erecting unit magnification system in which the planar-shaped lens array plate is used. FIG. 23A is a schematic view of an optical system of a lens array plate of an erecting unit magnification system 510 in which two sheets of the same planar-shaped lens array plates 501 are stacked. The light 514b obtained from irradiating point 516 (for example, for an image reading apparatus the reflected light from an original, or for an image writing apparatus the irradiating light from a light-emitting element) is focused into focusing point 518 through the erecting unit magnification lens array plate. There is provided the area for lenses formed on the planar-shaped lens array plate 501, which is fixed by a housing 530, with lens portions (for example, micro convex lens). The lens portions are generally formed both surfaces of the planar-shaped lens array plate 501. Besides, the lens portions may be spherical lenses or aspherical lenses.

FIG. 23B is an expanded side view of the planar-shaped lens array plate shown in FIG. 23A. The lens portions 502a and 502b are provided on the both surfaces of the planar-shaped lens array plate 501, respectively. Each optical axis of the lens portions is maintained on coaxial line. In addition, in order to stack the plurality of planar-shaped lens array plates 501, conical convex portions 512 are provided on one surface of the planar-shaped lens array plate 501 and concave portions 513, which are combined with each of the conical convex portion 512, are provided on the other surface of the planar-shaped lens array plate 501. Thereby, the plurality of the planar-shaped lens array plates can be stacked so that the optical axis of each of lens portions 502a and 502b are respectively coaxial, and thereby the lens array plate of an erecting unit magnification system 510 may be arranged. Besides, the lens portions 502a and 502b may be defined by the diameter "D" and the curvature radius "r" of the lens portion, and the thickness "d" of the lens, as shown in FIG. 23B. Moreover, the thickness "d" of the lens is defined as the thickness including micro convex lens portions formed in both surfaces of one planar-shaped lens array plate.

Here, the larger size of an image to be read or an image to be written should be longer size of the lens array plate of an erecting unit magnification system. However, the lens performance with the high quality optical performance is requested for reading or writing high-resolution image. The manufacturing of such a highly accurate lens array plate of an erecting unit magnification system becomes more difficult according to the longer size of the longer direction (i.e., the main scanning direction of the image reading apparatus or the image writing apparatus) of the lens array plate of an erecting unit magnification system.

For this purpose, for the image reading apparatus or the image writing apparatus for A3 size or more of the original (i.e., the length 326 mm or more in the longer direction), it is traditionally performed to arrange a longer rod lens array by a plurality of shorter rod lens arrays to provide such a highly accurate optical system. For example, such rod lens array is also used for a copier that copies a big original such as blueprints and industrial drawings of the A0 size (i.e., the length 980 mm in the longer direction length). The method of arranging such plural rod lens arrays in the longer direction is known (for example, it is disclosed in a patent document 2, Japanese Patent Application Laid-Open No. 1997-85,985). Moreover, the method of generating plural lens array plates of the erecting unit magnification system to arrange each of the plural lens array plates of the erecting unit magnification system in the longer direction is known (for example, it is disclosed in a patent document 3, Japanese Patent Application Laid-Open No. 2000-352,606).

Moreover, for a method of connecting optical sheets made of the resin in the longer direction, the method being not provided the lens array plate of an erecting unit-magnification system for the image-reading apparatus or the image-writing apparatus, the method of providing some adhesive to the cut section of the optical sheets to attach these optical sheets is known (for example, it is disclosed in a patent document 4, Japanese Patent Application Laid-Open No. 2002-258,019). Moreover, for the attaching of the optical sheets, a method for attaching these optical sheets so that each lens pitch of the lens portions of the optical sheets becomes wider is known (for example, it is disclosed in a patent document 5, Japanese Patent Publication No. 3,371,017).

Patent document 1: Japanese Patent Application Laid-Open No. 2005-37,891
Patent document 2: Japanese Patent Application Laid-Open No. 1997-85,985
Patent document 3: Japanese Patent Application Laid-Open No. 2000-352,606
Patent document 4: Japanese Patent Application Laid-Open No. 2002-258,019
Patent document 5: Japanese Patent Publication No. 3,371,017

DISCLOSURE OF THE INVENTION

Problems to be Solved by the Invention

However, the conventional method for manufacturing the planar-shaped lens array plate in the normal resin molding using a molding die should be applied by significant pressure on molding. That is, the requested pressure should be increased when it tries to enlarge the width of the planar-shaped lens array plate while maintaining the thinness thereof, and the strength of the molding die should be extremely increased. In addition, in conventional manufacturing method the technical load may be increased to mold a longer or larger area type of a planar-shaped lens array plate (hereinafter, it is referred to as a long, planar-shaped lens array plate). That is, forming the long, planar-shaped lens array plate by a molding die causes a large warp, and thereby extremely severe molding conditions may be requested. These problems provide the manufacturing cost or the deterioration of the optical performance in the long, planar-shaped lens array plate.

Moreover, the method for providing the image reading apparatus or the image writing apparatus using the rod lens array shown in the patent document 2 has an advantage of which each lens is optically independent due to light-shielding portion provided between rod-lenses (i.e., no occurrence of any cross-talk). However, this method causes the enlargement of the apparatus relative to the lens array plate of an erecting unit magnification system, as compared in FIGS. 22A and 22B. On the other hand, the method for providing the image reading apparatus or the image writing apparatus using the lens array plate of an erecting unit magnification system has an advantage of which the miniaturization of the apparatus is easy. However, the method for merely arranging a plurality of lens array plate of an erecting unit magnification systems has a problem that the image information of the location corresponding to the connecting portion between the lens array plate of an erecting unit magnification systems is deteriorated. Besides, the optical deterioration of such a connecting portion will be understood by the description of the embodiments as described later.

Moreover, it is undesirable to apply the technology of cutting and connecting of optical sheets, which is described in the patent document 3, to the long, planar-shaped lens array plate. That is, when the optical system is provided by cutting and connecting the lens portion of two planar-shaped lens array plates (refer to FIG. 23B), the incident light enters to the connecting portion (i.e., the cut section) twice. Thereby, the resolution (MTF) and the amount of light may be greatly decreased and the deterioration of the reading image may be caused. Similarly, the application of the technology for removing of concavity between lens portions of each of the optical-sheets and for connecting the optical sheets into the lens array-plate of an erecting unit magnification systems of multi-layer structure (shown in FIG. 23A) requests an extremely highly accurate manufacturing technology, and further involves the increased manufacturing cost.

The object of the present invention is to provide a longer or larger area type of a planar-shaped lens array plate to solve the above problems with lower deterioration of the optical-performance and with low-cost.

Means for Solving the Problem

In order to solve the above problems, the longer type of a lens array plate of an erecting unit magnification system is provided, the lengthy lens array plate of an erecting unit magnification system comprising a plurality of planar-shaped lens array plates, each planar-shaped lens array plate including a plurality of lens portions arranged regularly, wherein each of the plurality of planar-shaped lens array plates has a linear connecting portion at the position other than the plurality of lens portions.

According to another aspect of the present invention, an image reading apparatus is provided, the image reading apparatus comprising an light source for irradiating light into an original putted on an original glass plate; a plurality of light-receiving element lines for receiving the reflected light from the irradiated original to read the image information of the original; an erecting unit magnification lens for focusing the image information of the original on the plurality of light-receiving element lines; and a controller circuit including an image processing unit for controlling the reading of the image information and obtaining the image information to execute the predefined image-processing, wherein the overlap portion of light-receiving element lines consisting of at least two light-receiving element lines within the plurality of light-receiving element lines has, at least in part, the function used for multiplexing and receiving the image information that corresponds to the connecting portion, and the erecting unit magnification lens comprises said lengthy lens array plate of an erecting unit magnification system according to the present invention.

According to another aspect of the present invention, an image writing apparatus is provided, the image writing apparatus comprising a plurality of light-emitting element lines, each of the plurality of light-emitting element lines having comprising a plurality of light-emitting elements; a photo-sensitive dram for entering the image information by the emitted light from the light-emitting elements; an erecting unit magnification lens for focusing the emitted light from the light-emitting element lines on the photo-sensitive dram; and a controller circuit including an image processing unit for obtaining the image information to execute the predefined image-processing and control the entering of image information with respect to the photo-sensitive dram, wherein the overlap portion of light-emitting element lines consisting of at least two light-emitting element lines within the plurality of light-emitting element lines has, at least in part, the function used for multiplexing and writing the image information that corresponds to the connecting portion, and the erecting unit magnification lens comprises said lengthy lens array plate of an erecting unit magnification system according to the present invention.

According to another aspect of the present invention, a method for manufacturing the lengthy erecting unit magnification lens array is provided, the method comprising the step (a) of forming each of a plurality of planar-shaped lens array plates, each planar-shaped lens array plate including a plurality of lens portions arranged regularly; and the step (b) of connecting each of the plurality of planar-shaped lens array plates obtained in the step (a) into the longer direction thereof, wherein the connecting portion connected in the step (b) is formed at the position other than the plurality of the lens portions. Alternatively, a method for manufacturing the lengthy erecting unit magnification lens array is provided according to another aspect of the present invention, the method comprising the step (a) of cutting each of a plurality of planar-shaped lens array plates with a predefined angle to form a cut section thereof, each planar-shaped lens array plate including a plurality of lens portions arranged regularly; and the step (b) of connecting each of the plurality of planar-shaped lens array plates obtained in the step (a) into the longer direction thereof, wherein the connecting portion connected in the step (b) is formed at the position other than the plurality of the lens portions.

The Effect of the Invention

According to the present invention, a longer or larger area type of a planar-shaped lens array plate that has lower deterioration of the optical performance can be provided at low-cost.

BEST MODE FOR CARRYING OUT THE INVENTION

Firstly, the critical factors are described for the purpose of the understanding of the present invention.

To facilitate the understanding of the present invention, some terms "planar-shaped lens array plate", "lens array plate of an erecting unit magnification system", "rod lens array", and "erecting unit magnification lens array" are defined, respectively. The "planar-shaped lens array plate" means one lens array plate. The "lens array plate of an erecting unit magnification system" means an optical system for an erecting unit magnification with a plurality of lens array plates combined. The "rod lens array" means an arrangement being combined by a plurality of rod lens units. The "erecting unit magnification lens array" means a lens array as an optical system for an erecting unit magnification. That is, the lens array, which comprises the rod lens array or the lens array plate of an erecting unit magnification system, is generally referred to as an erecting unit magnification lens array.

Figure 1A:
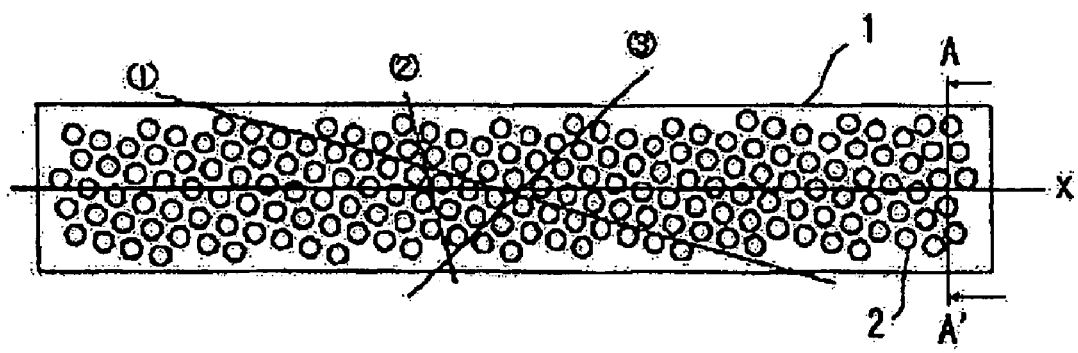
FIG. 1A is a plan view of a planar-shaped lens array plate in which a plurality of lens portions are formed.
Figure 1B:
FIG. 1B is a cross-sectional view in the depicted A-A' of the planar-shaped lens array plate shown in FIG. 1A.
Figure 1C:
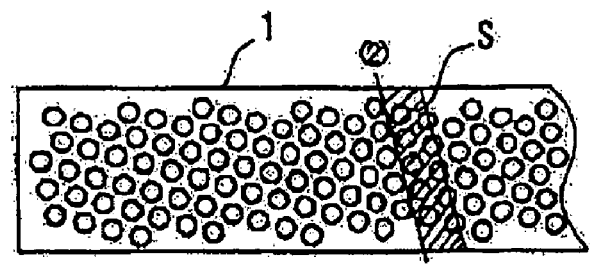
FIG. 1C is a schematic diagram depicting a method of cutting the planar-shaped lens array plate.

In order to arrange the lengthy lens array plate of an erecting unit magnification system according to the present invention, a planar-shaped lens array plate molded beforehand is cut to prepare a plurality of planar-shaped lens array plates to be connected. Therefore, a method for cutting the molded planar-shaped lens array plate is now described. FIGS. 1A-1C are diagrams depicting the method for cutting the molded planar-shaped lens array plate. FIG. 1A is a plan view of a planar-shaped lens array plate in which a plurality of lens portions are formed. FIG. 1B is a cross-sectional view in the depicted A-A' of the planar-shaped lens array plate shown in FIG. 1A. FIG. 1C is a schematic diagram depicting a method of cutting the planar-shaped lens array plate.

As shown in FIG. 1A, the lens portions of the planar-shaped lens array plate 1 are placed at hexagonal array. That is, the "hexagonal array" means the array being provided with six lens portions adjacent to one lens portion at equivalent distance. For the planar-shaped lens array plate 1 which includes lens arrangement provided with such hexagonal array, some kinds of the cutting angle are assumed as an angle for cutting at the portion other than the lens portions, such as the depicted (1), (2) and (3). In addition, such cutting angle may be considered as a "connecting angle" with respect to a main scanning direction (x-axis direction), as described later. For example, for the depicted (1) it means the connecting angle θs=15°, for the depicted (2) it means the connecting angle θs=75°, and for the depicted (3) it means the connecting angle θs=45°.

As shown in FIG. 1C, for example, when the planar-shaped lens array plate 1 is cut at the depicted (2), the lens portions of one side of the planar-shaped lens array plate 1 may be cut by high accuracy-cutting, as shown by the area "S". In this case, the lens portions of the other side of the planar-shaped lens array plate 1 to be cut remain as it is. Typically, the diameter of one lens portion has the width of tens of microns. For such cutting, the known dicing braid can cut it by several microns. Moreover, the other side of planar-shaped lens array plate 1 being cut at the area "S" may be further cut to get a plurality of planar-shaped lens array plates, in the same manner. Preferably, the further cutting-process may be omitted, if more high accuracy cutting is used to avoid cutting of the lens portions even at the area "S". Both of the planar-shaped lens array plates, which are cut in the above-mentioned method, may be used for the lengthy lens array plate, as described later. Moreover, such lengthy planar-shaped lens array plate can be formed by connecting each of the shorter type of planar-shaped lens array plates that are molded by molding die, each of the shorter type of planar-shaped lens array plates having a predefined connecting angle θs.

Figure 2:
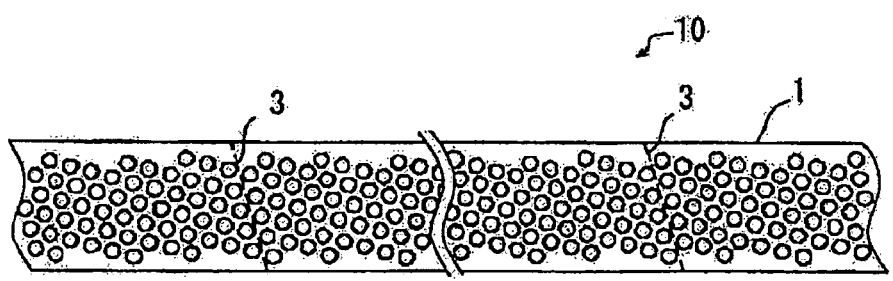
FIG. 2 is a plan view of a lengthy planar-shaped lens array plate connected with a plurality of planar-shaped lens array plates.

FIG. 2 is a plan view of the lengthy planar-shaped lens array plate connected with a plurality of planar-shaped lens array plates. The plurality of planar-shaped lens array plates cut by the above-described method in connection with FIG. 1A may be connected at the cut section (i.e., the cut section 3) being cut in said method so that any length type of the planar-shaped lens array plate 10 may be provided. Thus, any type of the planar-shaped lens array plate with high accuracy may be obtained from the planar-shaped lens array plates 1 that are molded by the predefined molding die. Therefore, there is no need to manufacture a molding die for the lengthy planar-shaped lens array plate. Thereby, the low-cost plate may be achieved. In addition, since the planar-shaped lens array plate is cut at the position other than the requested lens portion, the high accuracy-cutting will not be requested. Therefore, the lengthy planar-shaped lens array plate may be manufactured by the low-cost. In addition, any known adhesive may be used for the connection of these plates, since the type of the adhesive is not subject matter of the present invention.

Moreover, in such lengthy planar-shaped lens array plate, the number of lens portions may be increased at the position which effects to the image on the optical axis of the connecting portion so as to prevent loss of the amount of light at the connecting portion and the decrease of the image resolution. In that case, the distance between connected lens arrangement lines "X" is equal to or less than the distance between lens arrangement lines "P" (i.e., X≦P). The distance "X" (hereinafter, it is referred to as the "distance between connected lens arrangement lines") means the distance between the lens arrangement lines to be connected, which are the substantially parallel, nearest lens arrangement lines with respect to the connecting portion (in which one lens arrangement line is the line being connected with the adjacent lens portions of a plurality of lines which may be created by linking each center of the lens portions) linearly. The distance "P" (hereinafter, it is referred to as the "distance between lens arrangement lines") means the distance between the lens arrangement lines being substantially parallel lens arrangement lines with respect to the connecting portion, in which the connecting portion does not exist therebetween. Moreover, in the above case of substantially parallel lens arrangement lines with respect to the connecting portion, the "substantial parallel" means the degree of "parallel" of the lens arrangement lines being able to shift to the range that does not have an effect on the other lens portions.

Major factors are now described based on various embodiments to provide the lengthy lens array plate of an erecting unit magnification system.

Figure 3:
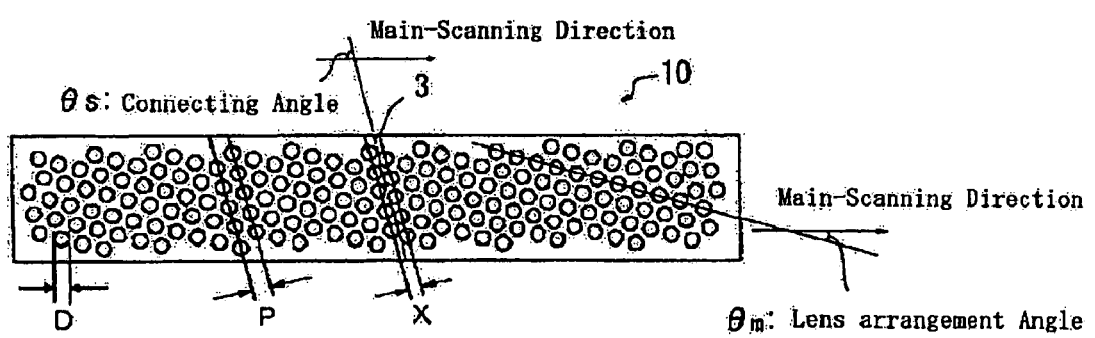
FIG. 3 is a schematic chart depicting a method of defining the dimensions of each factor of a lengthy lens array plate of an erecting unit magnification system that includes lens portions of hexagonal array in one embodiment in accordance with the present invention.

FIG. 3 is a schematic chart depicting a method of defining the dimensions of each factor of the lengthy planar-shaped lens array plate that includes lens portions of hexagonal array in one embodiment in accordance with the present invention. In the lengthy planar-shaped lens array plate 10, the diameter of a lens portion is given as "D", the distance between lens array arrangement lines that the planar-shaped lens array plate originally includes is given as "P", the distance between connected lens arrangement lines associated with the connecting portions 3 is given as "X". In addition, the lens arrangement angle that represents the arranged angle of the lens portions is given as "θm" which is defined as the smaller angle (maximum angle 90 degree) of the angles with respect to the line of the main scanning direction. Thus, while a plurality of lens arrangement angles exists in the hexagonal array of one planar-shaped lens array plate, the condition of the lens array arrangement of the planar-shaped lens array plate may be specified by defining one of the plurality of lens arrangement angles. In addition, the angle to the main scanning direction that the connecting portion obtained by said cutting is defined as the connecting angle θs. A variety of connecting angles θs may be generated on the basis of the distance between lens arrangement lines "P" other than the connecting angle of θs=15°, 45°, and 75° (refer to FIG. 1A), while the connecting angle of the connecting portion 3 is shown as θs=75° in FIG. 3.

Figure 4:
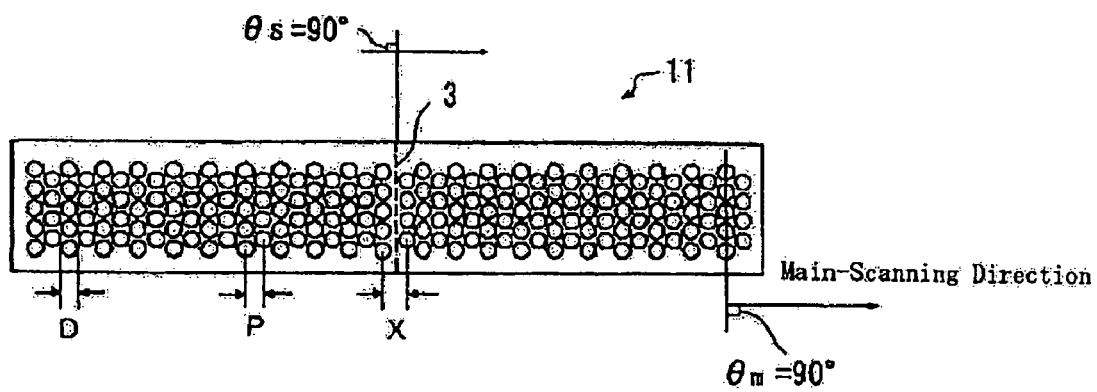
FIG. 4 is a plan view of a lengthy lens array plate of an erecting unit magnification system that includes lens portions of hexagonal array with the lens arrangement angle of 90 degree in one embodiment in accordance with the present invention.

FIG. 4 is a plan view of the lengthy planar-shaped lens array plate that includes lens portions of hexagonal array with the lens arrangement angle of 90 degree in one embodiment in accordance with the present invention. The way of defining the dimension of each element should be understood as well as FIG. 3, and thereby further description is omitted. The planar-shaped lens array plate 11 having the lens array angle θm of 90° is described as the difference from the planar-shaped lens array plate 10 shown in FIG. 3. A variety of connecting angles θs may be generated on the basis of the distance between lens arrangement lines "P" other than the connecting angle of θs=90°, while the connecting angle of the connecting portion 3 is shown as θs=90° in FIG. 4.

Then, to facilitate the understanding of the present invention, a lengthy lens array plate of an erecting unit magnification system in case of the absence of the connecting portion and the simulation result of the amount of light in the main scanning direction are described.

Figure 5:
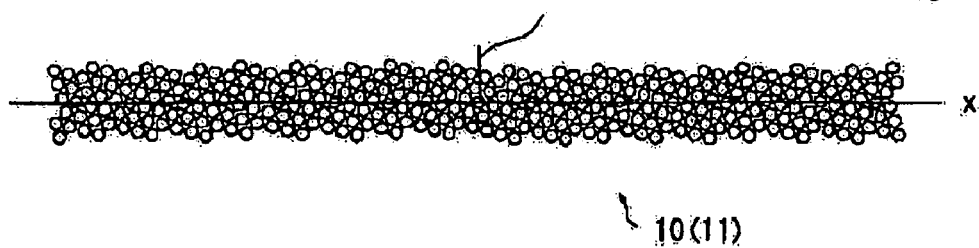
FIG. 5 is a plan view of a lengthy lens array plate of an erecting unit magnification system that includes lens portions of hexagonal array in case of the absence of the connecting portion in one embodiment in accordance with the present invention.

FIG. 5 is a plan view of the lengthy lens array plate of an erecting unit magnification system that includes lens portions of hexagonal array in case of the absence of the connecting portion in one embodiment in accordance with the present invention. The main scanning direction "x" is identical with the longer direction of the lens array plate of an erecting unit magnification system, and the center of the depicted x-axis corresponds to the position to be the connecting portion in embodiments described later. In addition, the lens arrangement angle shown in FIG. 5 is described based on the lens arrangement angle shown in FIG. 3 for the purpose of the convenience of the description merely, and so the lens arrangement angle may be replaced by the lens arrangement angle shown in FIG. 4.

Moreover, the amount of light distribution in the amount of light simulation according to each embodiment described later is computed by the following manner. In FIG. 5, a linear light source with the length 16 mm set on this side of this drawing (i.e., right above x-axis at the upper-side of the lens array plate of an erecting unit magnification system) along the main scanning direction (i.e., x-axis), and a light-receiving element-line set under side of this drawing (i.e., right under x-axis at the under-side of the lens array plate of an erecting unit magnification system). Each position of the lens array plate of an erecting unit magnification system and the linear light source were adjusted so that the center of the linear light source is identical with the position of the connecting portion, and the light irradiated from the linear light source was received by the light-receiving element line, and the amount of light distribution was measured. Thus, the amount of light distribution by simulation according to each embodiment was calculated.

Figure 6:
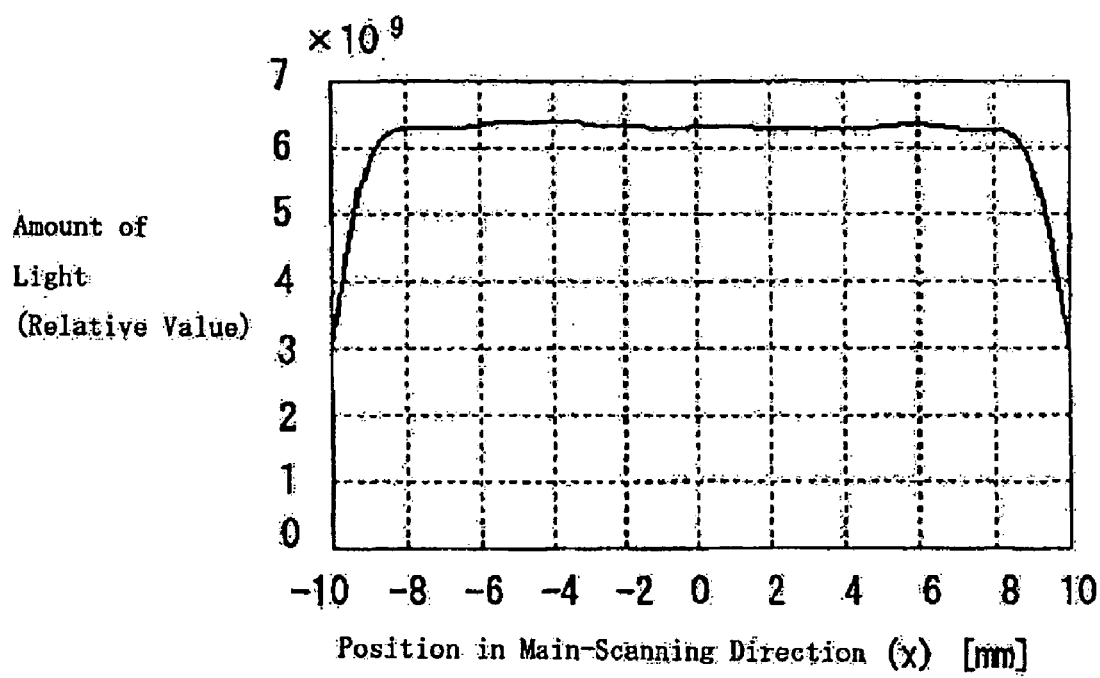
FIG. 6 is a chart showing the simulation result of the amount of light being obtained on a lengthy planar-shaped lens array plate that includes lens portions of hexagonal array in case of the absence of the connecting portion in one embodiment in accordance with the present invention.

FIG. 6 is a chart showing the simulation result of the amount of light being obtained on the lengthy planar-shaped lens array plate that includes lens portions of hexagonal array in case of the absence of the connecting portion. In this drawing, the center of x-axis is "0", and the amount of light with the accuracy of $10^9$ is shown as relative value for the evaluation within the range of ±10 mm from the center of x-axis in the main scanning direction (i.e., the longer direction of the lens array plate of an erecting unit magnification system).

That is, the amount of light shown in FIG. 6 is used for the reference data, which is measured by the distribution of irregular amount of light of the lens array plate of an erecting unit magnification system being combined by two planar-shaped lens array plates without cutting. The reference data corresponds to the data as "blank" that is shown in FIGS. 7-16 described later.

Then, each embodiment of a lens array plate of an erecting unit magnification system according to the present invention is described, and a first embodiment is firstly described. In the following embodiments, each linear connecting portion of two planar-shaped lens array plates provided for the lens array plate of an erecting unit magnification system is arranged at the identical position.

A First Embodiment

In this embodiment, a lengthy lens array plate of an erecting unit magnification system having lens portions of hexagonal array being shown in FIG. 3 comprises the diameter of a lens portion, D=0.280 mm; the distance between lens arrangement lines, P=0.350 mm; the curvature radius, r=0.552 mm; the thickness of the lens, d=1.92 mm; the given lens portions being provided on both surfaces of the planar-shaped lens array plate (refer to FIG. 23B); the hexagonal array; the number of rows of lens portions, 5 rows; the lens arrangement angle, θm=15°; the connecting angle, θs=75°; and the distance between connected lens arrangement lines, X=0.340 mm. That is, the distance between connected lens arrangement lines is composed of X=P−0.01=0.35−0.01=0.34 mm. The simulation result of amount of light is described later.

Then, a second embodiment is described.

A Second Embodiment

In this embodiment, a lengthy lens array plate of an erecting unit magnification system having lens portions of hexagonal array being shown in FIG. 3 comprises the diameter of a lens portion, D=0.280 mm; the distance between lens arrangement lines, P=0.350 mm; the curvature radius, r=0.552 mm; the thickness of the lens, d=1.92 mm; the given lens portions being provided on both surfaces of the planar-shaped lens array plate (refer to FIG. 23B); the hexagonal array; the number of rows of lens portions, 5 rows; the lens arrangement angle, θm=15°; the connecting angle, θs=75°; and the distance between connected lens arrangement lines, X=0.300 mm. That is, the distance between connected lens arrangement lines is composed of X=P−0.05=0.35−0.05=0.30 mm.

Figure 7:
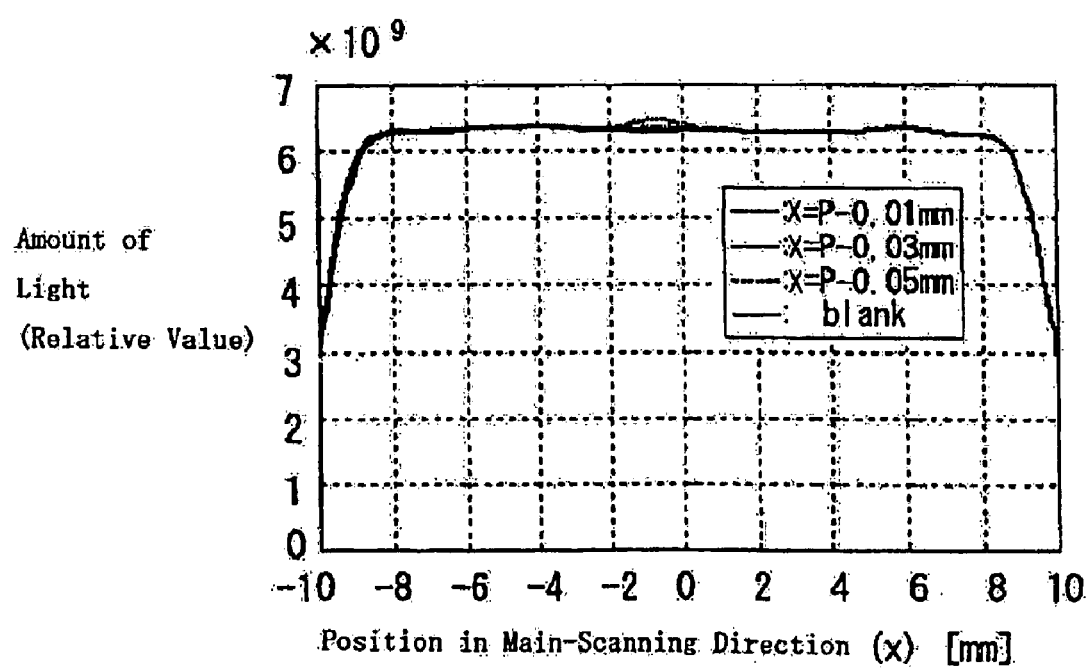
FIG. 7 is a chart showing the simulation result of the amount of light based on a first embodiment and a second embodiment in accordance with the present invention.

FIG. 7 is a chart showing the simulation result of the amount of light based on the first embodiment and a second embodiment in accordance with the present invention. In this drawing, each amount of light shown as X=P−0.03 and "blank" other than X=P−0.01 and X=P−0.05 in the first and second embodiments is shown for the comparison. It is clearly noticed in FIG. 7 that the amount of light in the connecting portion becomes larger than the amount of light shown as "blank" by narrowing the distance between connected lens arrangement lines "X", i.e., by bringing close the adjacent lenses to the connecting portion.

Then, a first comparative example to the first and second embodiments is described.

In this comparative example, a lengthy lens array plate of an erecting unit magnification system having lens portions of hexagonal array being shown in FIG. 3 comprises the diameter of a lens portion, D=0.280 mm; the distance between lens arrangement lines, P=0.350 mm; the curvature radius, r=0.552 mm; the thickness of the lens, d=1.92 mm; the given lens portions being provided on both surfaces of the planar-shaped lens array plate (refer to FIG. 23B); the hexagonal array; the number of rows of lens portions, 5 rows; the lens arrangement angle, θm=15°; the connecting angle, θs=75°; and the distance between connected lens arrangement lines, X=0.400 mm. That is, the distance between connected lens arrangement lines is composed of X=P+0.05=0.35+0.05=0.40 mm.

Figure 8:
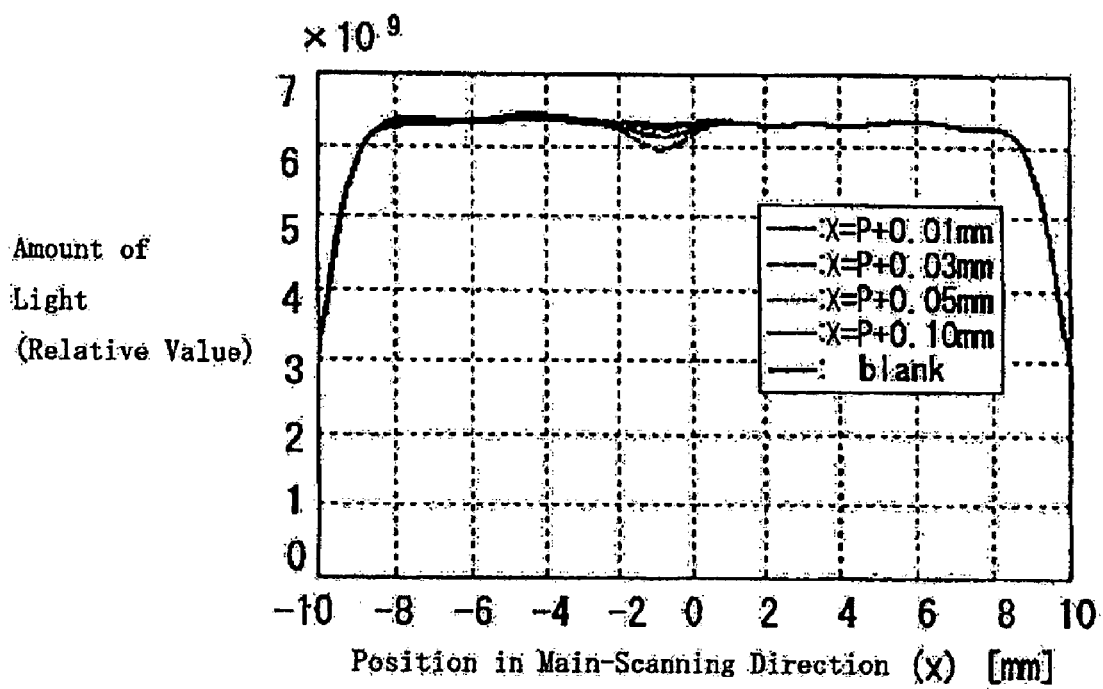
FIG. 8 is a chart showing the simulation result of the amount of light based on a first comparative example with respect to the first embodiment and the second embodiment in accordance with the present invention.

FIG. 8 is a chart showing the simulation result of the amount of light based on the first comparative example. In this drawing, each amount of light shown as X=P+0.01, X=P+0.03, X=P+0.10 and "blank" other than X=P+0.05 in the first comparative example is shown for the comparison. It is clearly noticed in FIG. 8 that the amount of light in the connecting portion becomes smaller than the amount of light shown as "blank" by expanding the distance between connected lens arrangement lines "X", i.e., by bringing far the adjacent lenses to the connecting portion.

Then, a third embodiment is described.

A Third Embodiment

In this embodiment, a lengthy lens array plate of an erecting unit magnification system having lens portions of hexagonal array being shown in FIG. 3 comprises the diameter of a lens portion, D=0.280 mm; the distance between lens arrangement lines, P=0.350 mm; the curvature radius, r=0.552 mm; the thickness of the lens, d=1.92 mm; the given lens portions being provided on both surfaces of the planar-shaped lens array plate (refer to FIG. 23B); the hexagonal array; the number of rows of lens portions, 5 rows; the lens arrangement angle, θm=15°; the connecting angle, θs=15°; and the distance between connected lens arrangement lines, X=0.300 mm. That is, the distance between connected lens arrangement lines is composed of X=P−0.05=0.35−0.05=0.30 mm.

Figure 9:
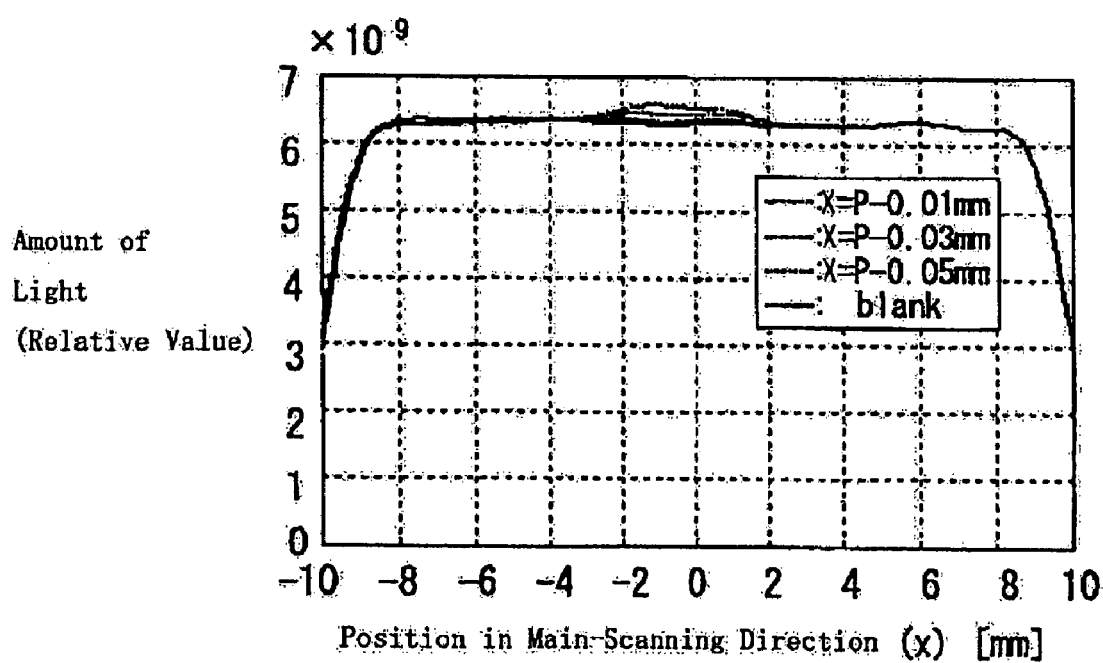
FIG. 9 is a chart showing the simulation result of the amount of light based on a third embodiment in accordance with the present invention.

FIG. 9 is a chart showing the simulation result of the amount of light based on the third embodiment. In this drawing, each amount of light shown as X=P−0.01, X=P−0.03 and "blank" other than X=P−0.05 in the third embodiments is shown for the comparison. It is clearly noticed in FIG. 9 that the amount of light in the connecting portion becomes larger than the amount of light shown as "blank" by narrowing the distance between connected lens arrangement lines "X", i.e., by bringing close the adjacent lenses to the connecting portion.

Then, a second comparative example to the third embodiment is described.

In this comparative example, a lengthy lens array plate of an erecting unit magnification system having lens portions of hexagonal array being shown in FIG. 3 comprises the diameter of a lens portion, D=0.280 mm; the distance between lens arrangement lines, P=0.350 mm; the curvature radius, r=0.552 mm; the thickness of the lens, d=1.92 mm; the given lens portions being provided on both surfaces of the planar-shaped lens array plate (refer to FIG. 23B); the hexagonal array; the number of rows of lens portions, 5 rows; the lens arrangement angle, θm=15°; the connecting angle, θs=15°; and the distance between connected lens arrangement lines, X=0.400 mm. That is, the distance between connected lens arrangement lines is composed of X=P+0.05=0.35+0.05=0.40 mm.

Figure 10:
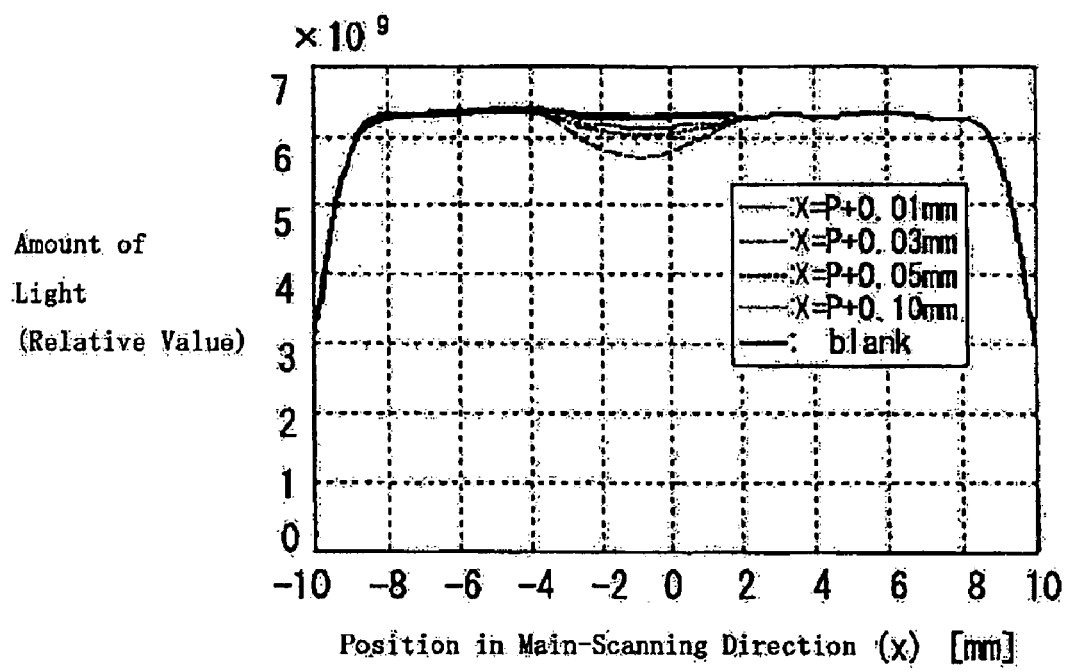
FIG. 10 is a chart showing the simulation result of the amount of light based on a second comparative example with respect to the third embodiment in accordance with the present invention.

FIG. 10 is a chart showing the simulation result of the amount of light based on the second comparative example. In this drawing, each amount of light shown as X=P+0.01, X=P+0.03, X=P+0.10 and "blank" other than X=P+0.05 in the second comparative example is shown for the comparison. It is clearly noticed in FIG. 10 that the amount of light in the connecting portion becomes smaller than the amount of light shown as "blank" by expanding the distance between connected lens arrangement lines "X", i.e., by bringing far the adjacent lenses to the connecting portion.

Then, a fourth embodiment is described.

A Fourth Embodiment

In this embodiment, a lengthy lens array plate of an erecting unit magnification system having lens portions of hexagonal array being shown in FIG. 3 comprises the diameter of a lens portion, D=0.280 mm; the distance between lens arrangement lines, P=0.350 mm; the curvature radius, r=0.552 mm; the thickness of the lens, d=1.92 mm; the given lens portions being provided on both surfaces of the planar-shaped lens array plate (refer to FIG. 23B); the hexagonal array; the number of rows of lens portions, 5 rows; the lens arrangement angle, θm=15°; the connecting angle, θs=45°; and the distance between connected lens arrangement lines, X=0.300 mm. That is, the distance between connected lens arrangement lines is composed of X=P−0.05=0.35−0.05=0.30 mm.

Figure 11:
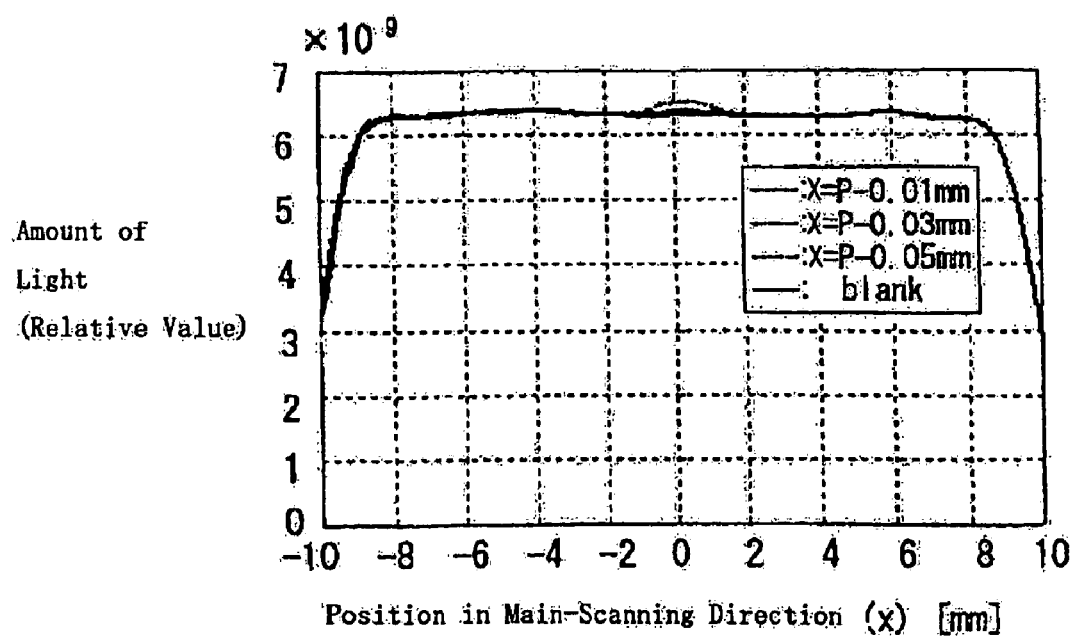
FIG. 11 is a chart showing the simulation result of the amount of light based on a fourth embodiment in accordance with the present invention.

FIG. 11 is a chart showing the simulation result of the amount of light based on the fourth embodiment. In this drawing, each amount of light shown as X=P−0.01, X=P−0.03 and "blank" other than X=P−0.05 in the fourth embodiments is shown for the comparison. It is clearly noticed in FIG. 11 that the amount of light in the connecting portion becomes larger than the amount of light shown as "blank" by narrowing the distance between connected lens arrangement lines "X", i.e., by bringing close the adjacent lenses to the connecting portion.

Then, a third comparative example to the fourth embodiment is described.

In this comparative example, a lengthy lens array plate of an erecting unit magnification system having lens portions of hexagonal array being shown in FIG. 3 comprises the diameter of a lens portion, D=0.280 mm; the distance between lens arrangement lines, P=0.350 mm; the curvature radius, r=0.552 mm; the thickness of the lens, d=1.92 mm; the given lens portions being provided on both surfaces of the planar-shaped lens array plate (refer to FIG. 23B); the hexagonal array; the number of rows of lens portions, 5 rows; the lens arrangement angle, θm=15°; the connecting angle, θs=45°; and the distance between connected lens arrangement lines, X=0.400 mm. That is, the distance between connected lens arrangement lines is composed of X=P+0.05=0.35−0.05=0.40 mm.

Figure 12:
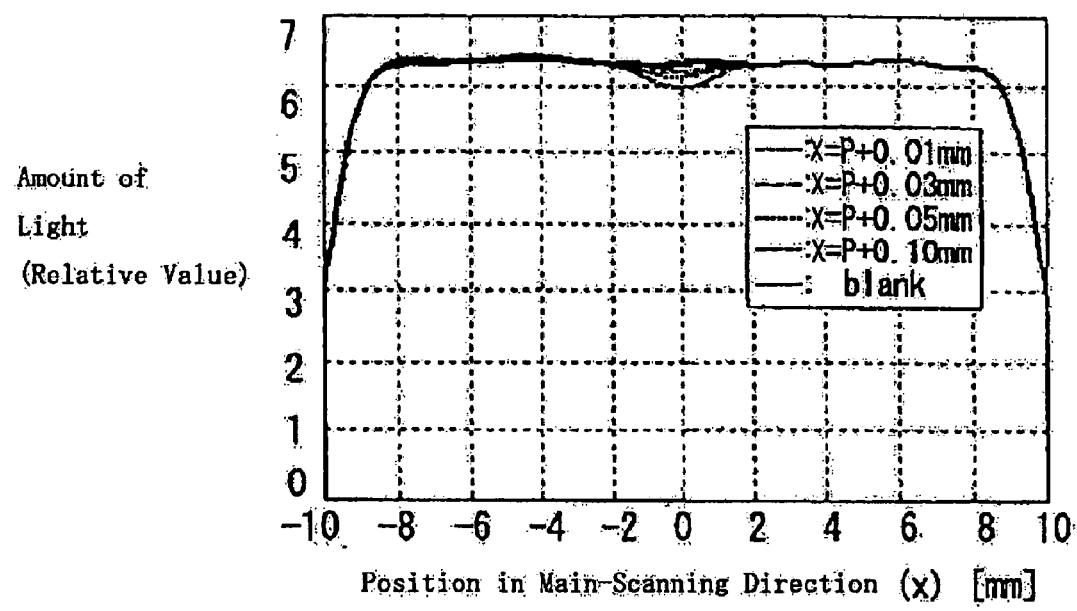
FIG. 12 is a chart showing the simulation result of the amount of light based on a third comparative example with respect to the fourth embodiment in accordance with the present invention.

FIG. 12 is a chart showing the simulation result of the amount of light based on the third comparative example. In this drawing, each amount of light shown as X=P+0.01, X=P+0.03, X=P+0.10 and "blank" other than X=P+0.05 in the third comparative example is shown for the comparison. It is clearly noticed in FIG. 12 that the amount of light in the connecting portion becomes smaller than the amount of light shown as "blank" by expanding the distance between connected lens arrangement lines "X", i.e., by bringing far the adjacent lenses to the connecting portion.

Then, a fifth embodiment is described.

A Fifth Embodiment

In this embodiment, a lengthy lens array plate of an erecting unit magnification system having lens portions of hexagonal array being shown in FIG. 4 comprises the diameter of a lens portion, D=0.280 mm; the distance between lens arrangement lines, P=0.350 mm; the curvature radius, r=0.552 mm; the thickness of the lens, d=1.92 mm; the given lens portions being provided on both surfaces of the planar-shaped lens array plate (refer to FIG. 23B); the hexagonal array; the number of rows of lens portions, 5 rows; the lens arrangement angle, θm=90°; the connecting angle, θs=90°; and the distance between connected lens arrangement lines, X=0.300 mm. That is, the distance between connected lens arrangement lines is composed of X=P−0.05=0.35−0.05=0.30 mm.

Figure 13:
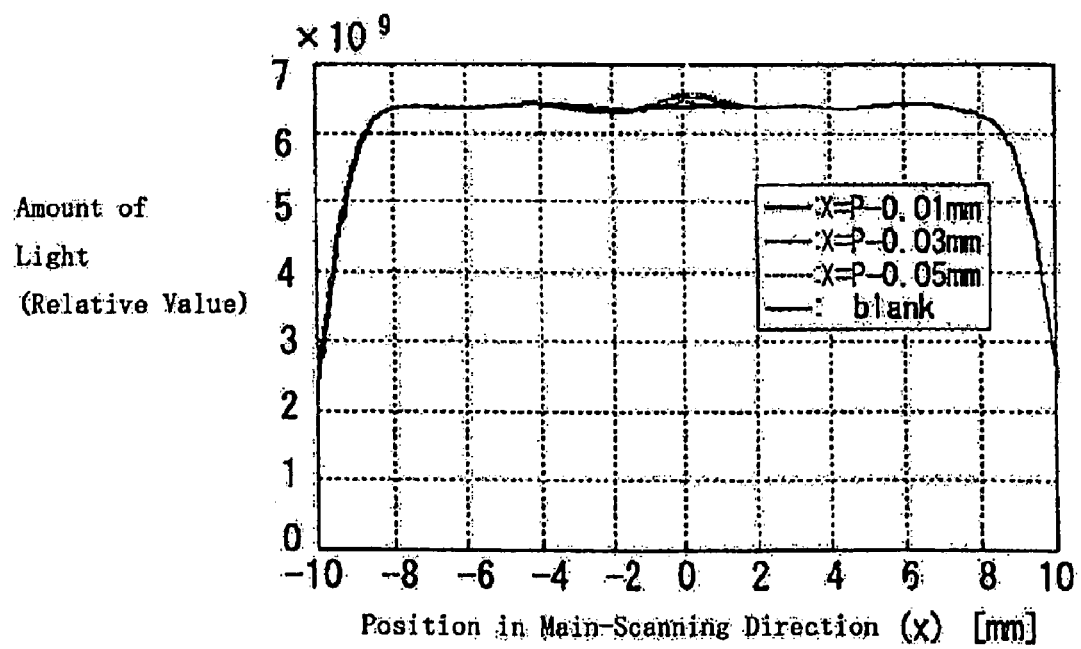
FIG. 13 is a chart showing the simulation result of the amount of light based on a fifth embodiment in accordance with the present invention.

FIG. 13 is a chart showing the simulation result of the amount of light based on the fifth embodiment. In this drawing, each amount of light shown as X=P−0.01, X=P−0.03 and "blank" other than X=P−0.05 in the fifth embodiments is shown for the comparison. It is clearly noticed in FIG. 13 that the amount of light in the connecting portion becomes larger than the amount of light shown as "blank" by narrowing the distance between connected lens arrangement lines "X", i.e., by bringing close the adjacent lenses to the connecting portion.

Then, a fourth comparative example to the fifth embodiment is described.

In this comparative example, a lengthy lens array plate of an erecting unit magnification system having lens portions of hexagonal array being shown in FIG. 4 comprises the diameter of a lens portion, D=0.280 mm; the distance between lens arrangement lines, P=0.350 mm; the curvature radius, r=0.552 mm; the thickness of the lens, d=1.92 mm; the given lens portions being provided on both surfaces of the planar-shaped lens array plate (refer to FIG. 23B); the hexagonal array; the number of rows of lens portions, 5 rows; the lens arrangement angle, θm=90°; the connecting angle, θs=90°; and the distance between connected lens arrangement lines, X=0.400 mm. That is, the distance between connected lens arrangement lines is composed of X=P+0.05=0.35+0.05=0.40 mm.

Figure 14:
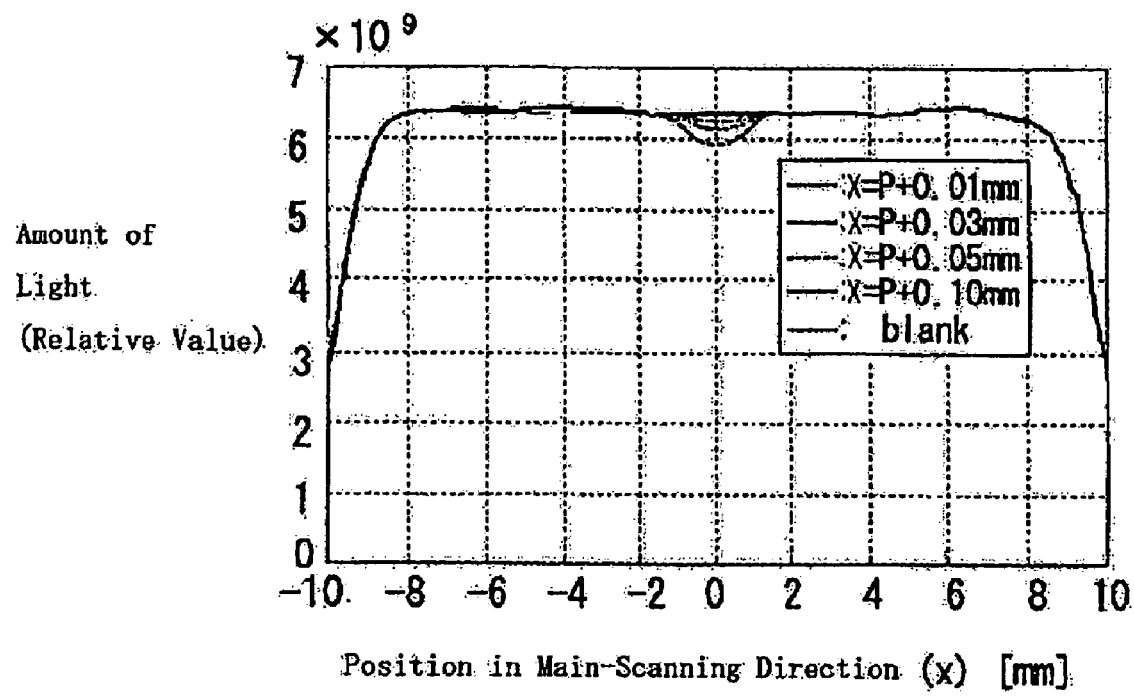
FIG. 14 is a chart showing the simulation result of the amount of light based on a fourth comparative example with respect to the fifth embodiment in accordance with the present invention.

FIG. 14 is a chart showing the simulation result of the amount of light based on the fourth comparative example. In this drawing, each amount of light shown as X=P+0.01, X=P+0.03, X=P+0.10 and "blank" other than X=P+0.05 in the fourth comparative example is shown for the comparison. It is clearly noticed in FIG. 14 that the amount of light in the connecting portion becomes smaller than the amount of light shown as "blank" by expanding the distance between connected lens arrangement lines "X", i.e., by bringing far the adjacent lenses to the connecting portion.

Then, a sixth embodiment is described.

A Sixth Embodiment

In this embodiment, a lengthy lens array plate of an erecting unit magnification system having lens portions of hexagonal array being shown in FIG. 4 comprises the diameter of a lens portion, D=0.280 mm; the distance between lens arrangement lines, P=0.350 mm; the curvature radius, r=0.552 mm; the thickness of the lens, d=1.92 mm; the given lens portions being provided on both surfaces of the planar-shaped lens array plate (refer to FIG. 23B); the hexagonal array; the number of rows of lens portions, 5 rows; the lens arrangement angle, θm=90°; the connecting angle, θs=60°; and the distance between connected lens arrangement lines, X=0.300 mm. That is, the distance between connected lens arrangement lines is composed of X=P−0.05=0.35−0.05=0.30 mm.

Figure 15:
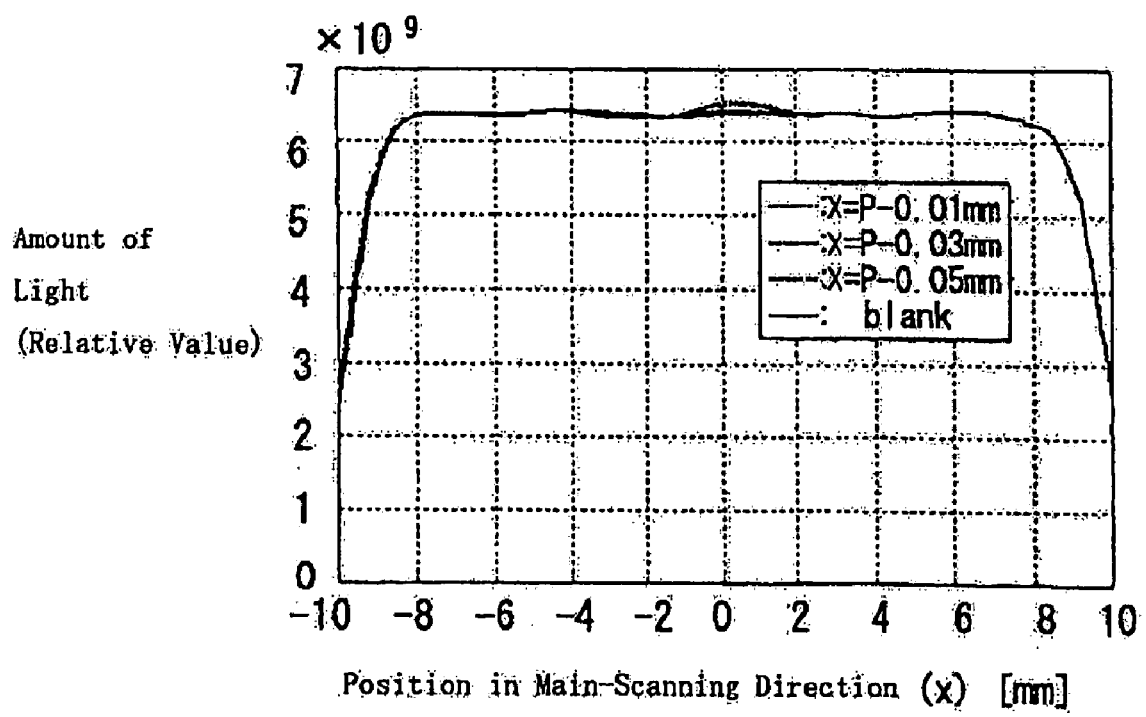
FIG. 15 is a chart showing the simulation result of the amount of light based on a sixth embodiment in accordance with the present invention.

FIG. 15 is a chart showing the simulation result of the amount of light based on the sixth embodiment. In this drawing, each amount of light shown as X=P−0.01, X=P−0.03 and "blank" other than X=P−0.05 in the sixth embodiments is shown for the comparison. It is clearly noticed in FIG. 15 that the amount of light in the connecting portion becomes larger than the amount of light shown as "blank" by narrowing the distance between connected lens arrangement lines "X", i.e., by bringing close the adjacent lenses to the connecting portion.

Then, a fifth comparative example to the sixth embodiment is described.

In this comparative example, a lengthy lens array plate of an erecting unit magnification system having lens portions of hexagonal array being shown in FIG. 4 comprises the diameter of a lens portion, D=0.280 mm; the distance between lens arrangement lines, P=0.350 mm; the curvature radius, r=0.552 mm; the thickness of the lens, d=1.92 mm; the given lens portions being provided on both surfaces of the planar-shaped lens array plate (refer to FIG. 23B); the hexagonal array; the number of rows of lens portions, 5 rows; the lens arrangement angle, θm=90°; the connecting angle, θs=60°; and the distance between connected lens arrangement lines, X=0.400 mm. That is, the distance between connected lens arrangement lines is composed of X=P+0.05=0.35+0.05=0.40 mm.

Figure 16:
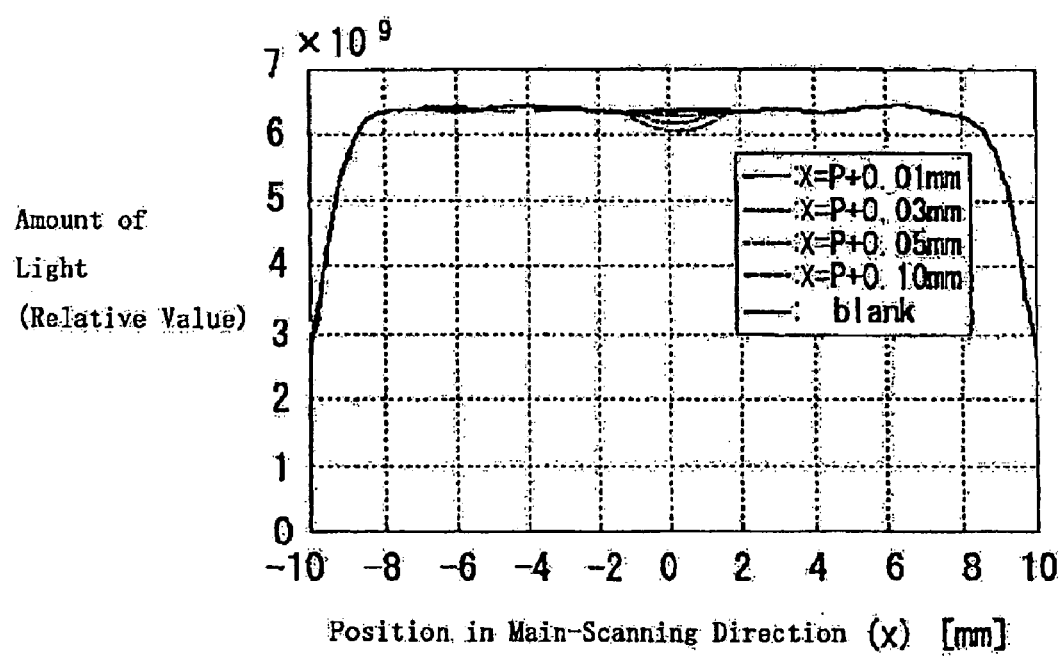
FIG. 16 is a chart showing the simulation result of the amount of light based on a fifth comparative example with respect to the sixth embodiment in accordance with the present invention.

FIG. 16 is a chart showing the simulation result of the amount of light based on the fifth comparative example. In this drawing, each amount of light shown as X=P+0.01, X=P+0.03, X=P+0.10 and "blank" other than X=P+0.05 in the fifth comparative example is shown for the comparison. It is clearly noticed in FIG. 16 that the amount of light in the connecting portion becomes smaller than the amount of light shown as "blank" by expanding the distance between connected lens arrangement lines "X", i.e., by bringing far the adjacent lenses to the connecting portion.

Thus, FIGS. 7-16 are data that were measured of the distribution of irregular amount of light according to the conditions described in the first to sixth embodiments and the first to fifth comparative examples when the distance between lens arrangement lines "P" is brought close (or far) at three stages. In each embodiment, the amount of light in the connecting portion becomes larger than the amount of light shown as "blank" by bringing close the distance between connected lens arrangement lines "X" rather than by bringing far it. Moreover, it is noticed that the variation of the amount of light in the connecting portion (i.e., the sensitivity of the amount of light to the distance between connected lens arrangement lines in the connecting portion) becomes small, if it is X≦P. That is, this means that image deterioration may be decreased by bringing close the distance between connected lens arrangement lines, since the improved S/N ratio for reading the image may be obtained due to the increased amount of light, rather than the decreased amount of light. Moreover, the state of X=P is equivalent to the state before the planar-shaped lens array plate is cut, and does not cause the irregular amount of light, and so it is noticed this state is most suitable. Moreover, meeting the state of D<X between the diameter of lens portion "D" and the distance between connected lens arrangement lines "X" means that, for example, in cutting the shape of lens portion adjacent to the connecting portions does not have any influence, and so a desired optical performance may be obtained.

In general, in order to form a lengthy lens array plate of an erecting unit magnification system by connecting a plurality of planar-shaped lens array plates, the connecting portion in which an optical performance of lens portions is maintained should be connected. Preferably, such optical performance of lens portions is defined as the magnitude of the amount of light focused in accordance with the distance between both sides of lens portions adjacent to the connecting portion (therein after, it is referred to as the focusing amount of light), so that the magnitude of the focusing amount of light at the connecting portion becomes larger than the magnitude of the focusing amount of light at the position other than the connecting portion. Alternatively, such optical performance of lens portions is defined as the value of MTF (which is known as the measure estimating the optical resolution) in accordance with the distance between connected lens arrangement lines, so that the magnitude of the MTF value at the connecting portion is substantially identical with the magnitude of the MTF value at the position other than the connecting portion. More preferably, the distance between connected lens arrangement lines "X", which means the distance between lens arrangement lines to be connected being substantially parallel, nearest lens arrangement lines with respect to the connecting portion, is provided to be equal to or less than the distance between lens arrangement lines "P", which means the distance between lens arrangement lines being substantially parallel lens arrangement lines with respect to the connecting portion, and the connecting portion does not exist within the distance between lens arrangement lines "P". More preferably, the distance between connected lens arrangement lines "X" is provided to meet the condition of D<X≦P where the "D" is the diameter of a lens portion.

Moreover, in order to provide a suitable lengthy lens array plate of an erecting unit magnification system based on FIGS. 7-16 that correspond to the first to sixth embodiments and the first to fifth comparative examples, the lens arrangement should be hexagonal array in which lens portions are alternately arranged with respect to the main scanning direction of the planar-shaped lens array plate (refer to FIG. 3). In addition, when the approximated line to the connecting portion is given (i.e., the line of the connecting angle θs), the approximated line preferably has an angle within the range of 0°<θs<90° with respect to the main scanning direction (i.e., the longer direction of the planar-shaped lens array plate). More preferably, the approximated line preferably has an angle within the range of 75°<θs<90° to the main scanning direction.

For example, it is noticed that the width of irregular amount of light (the width of the amount of light increased relative to the flat level) tends to decrease by bringing close the connecting angle θs to about 90° in FIG. 7, FIG. 9, FIG. 11, FIG. 13, and FIG. 15. If the connecting angle θs is close to 90°, the number of lens portions adjacent to the connecting portion may be minimized. This causes an effect that the connecting portion may be easily formed. Therefore, bringing close the connecting angle θs to 90°, as much as possible, is preferable to make the irregular amount of light smaller.

Figure 17:
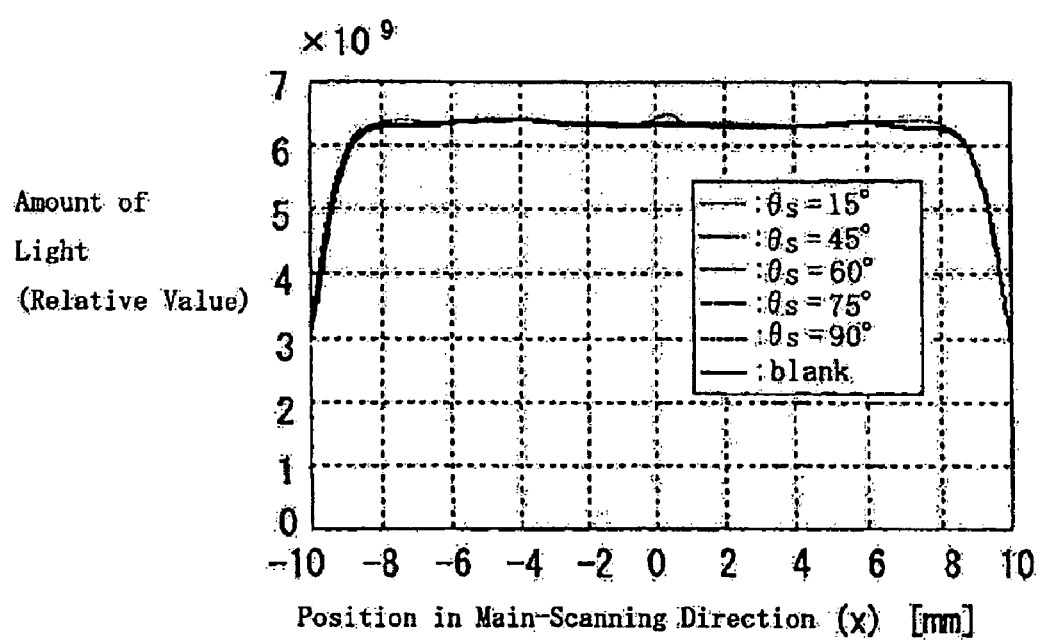
FIG. 17 is a chart showing comparison of the simulation results of the amount of light in X=P−0.01.

Thus, in order to reduce the irregular amount of light due to the connecting portion, it might be preferable that the connecting angle is equal to 90°. However, it is noticed that the undesired irregular amount of light is caused in only case of the connecting angle of 90°, in comparing the amount of light distribution at X=P−0.01 in FIGS. 7, 9, 11, 13 and 15 (i.e., refer to FIG. 17). It is considered that this is because the focusing efficiency from the sub-scanning direction for lens portions being nearest to the connecting portion becomes small.

Moreover, if the lens array plate of the erecting unit magnification system provided by stacking a plurality of planar-shaped lens array plates, in which each thereof has the connecting portion at the identical position, is used for an image reading apparatus etc. with two light-receiving element lines for reading as described later (FIGS. 18 and 19 described later), each connecting portion in the two light-receiving element lines becomes identical position when the connecting angle is 90°. Therefore, it is unsuitable to even the interpolation processing of the image information that uses two light-receiving element lines in case of the connecting angle θs of 90°. Thus, it is preferable that the connecting angle θs is not 90°, and it is preferable to bring close the connecting angle θs up to 90°, as much as possible. Preferably, the connecting angle θs should be within the range of 75°<θs<90°, so that the strict cutting accuracy of a planar-shaped lens array plate is not demanded to form the connecting portion.

As a seventh embodiment, it is now described about application examples that uses a lengthy lens array plate of an erecting unit magnification system in accordance with the present invention based on the positional relation with the light-receiving/writing element array used for an image reading apparatus or an image writing apparatus.

A Seventh Embodiment

Figure 18:
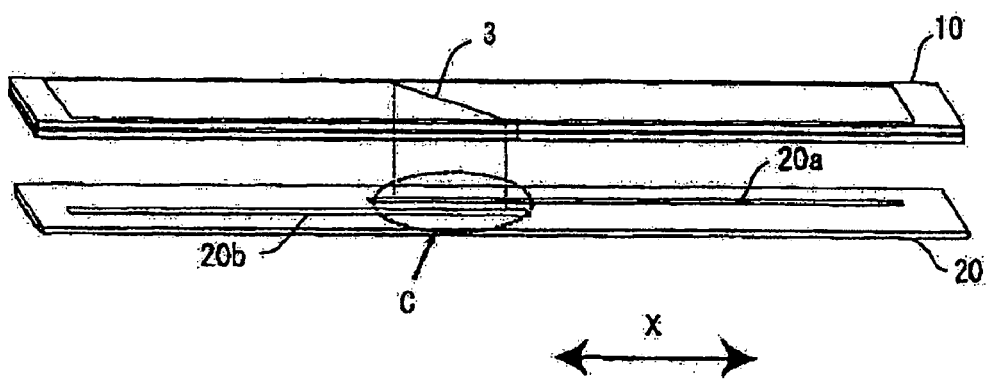
FIG. 18 is a schematic diagram showing a further applied optical system using a lengthy lens array plate of an erecting unit magnification system in accordance with the present invention, based on the positional relation to a light-receiving or emitting element array used for an image reading apparatus or an image writing apparatus.

FIG. 18 is a schematic diagram showing a further applied optical system using the lengthy lens array plate of an erecting unit magnification system in accordance with the present invention, based on the positional relation to a light-receiving or emitting element array used for an image reading apparatus or an image writing apparatus. The optical system shown in FIG. 18 comprises a lens array plate of an erecting unit magnification system being connected with two sheets of the lengthy planar-shaped lens array plate 10; an image sensor for reading the image information of an original by the reflected light from the original putted on an original glass plate, the original being irradiated by light, and the image sensor including an image sensor substrate 20 having a plurality of light-receiving element lines 20a and 20b; and a controller circuit 208 for controlling the reading of image information (as described later in FIG. 20). In addition, at least two light-receiving element lines 20a and 20b of a plurality of light-receiving element lines have the overlap portion of light-receiving element lines "C" that enables to read the duplicate information of the image information in the main scanning direction. Moreover, the overlap portion of light-receiving element lines "C" is provided to enable to read the image information corresponding to at least connecting portion 3. The controller circuit 208 may be provided for an image reading apparatus or an image writing apparatus that includes an image-processing unit 204 (as described later in FIG. 20) for performing the predefined image processing of the image information corresponding to the connecting portion. Moreover, the image sensor may be a CCD image sensor or a CMOS image sensor.

The optical system in FIG. 18 provides the overlap portion for the image-reading (i.e., the overlap portion of light-receiving element lines). In this case, using a lengthy lens array plate of an erecting unit magnification system according to the present invention, a more suitable image may be obtained by acquiring both image data of the connecting portion and other than the connecting portion to interpolate the image data by means of the image-processing unit 204. For such interpolation processing, for example, it is assumed to selectively process the image information obtained from each light-receiving element provided for the overlap portion of light-receiving element lines, or to process the weighted value to be added of the image information obtained from each light-receiving element provided for the overlap portion of light-receiving element lines.

Figure 19:
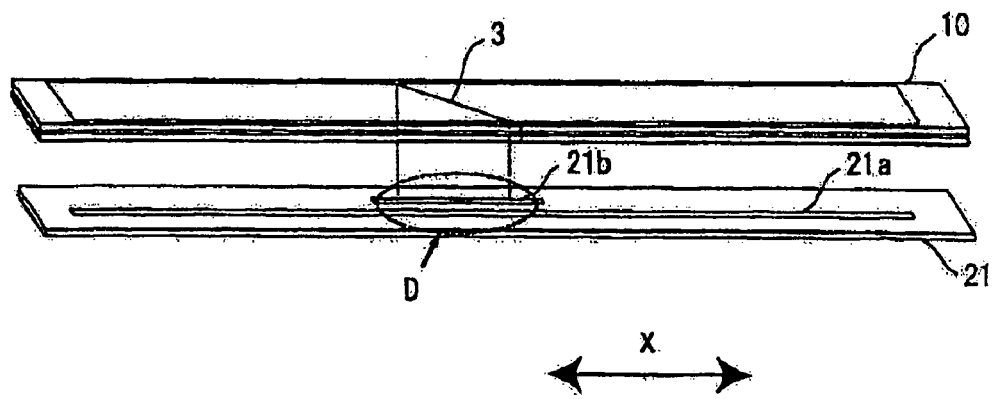
FIG. 19 is a schematic diagram showing a further applied optical system using a lengthy lens array plate of an erecting unit magnification system in accordance with the present invention, based on the positional relation to a light-receiving or emitting element array used for an image reading apparatus or an image writing apparatus.

FIG. 19 is a schematic diagram showing a further applied optical system using the lengthy lens array plate of an erecting unit magnification system in accordance with the present invention, based on the positional relation to a light-receiving or emitting element array used for an image reading apparatus or an image writing apparatus. The optical system shown in FIG. 19 is a modification example of the optical system shown in FIG. 18, in which an image sensor substrate 21 may be provided instead of the image sensor substrate 20 that includes a plurality of light-receiving element lines 20a and 20b. The image sensor substrate 21 comprises a light-receiving element line 21a provided for the main line as the full area of the main scanning direction; and a light-receiving element line 21b provided for the sub-line that enables to read the image information corresponding to the connecting portion 3. As a result, it may be assumed that the overlap portion of light-receiving element lines "D" is identical with the overlap portion of light-receiving element lines "C", and the same effect as the optical system shown in FIG. 18 can be achieved.

It should be noticed that, in the image sensor substrates 20 and 21 described in FIG. 18 and FIG. 19, the "light-receiving element line" may be replaced by the "light-emitting element line" (not shown) for an image writing apparatus that includes the function for writing the image, such as a printer. In this manner, the term of the "overlap portion of light-receiving element lines" may be replaced by the "overlap portion of light-emitting element lines" for the sake of the convenience on the description.

Figure 23A:
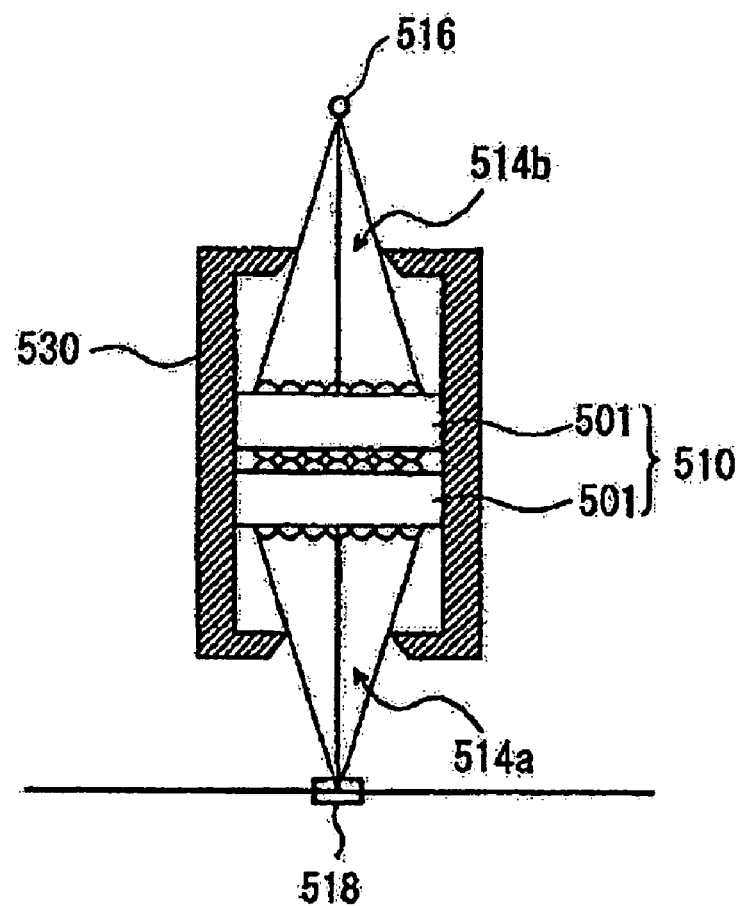
FIG. 23A is a schematic view of an optical system of a lens array plate of an erecting unit magnification system in which two sheets of the same planar-shaped lens array plates are stacked.
Figure 23B:
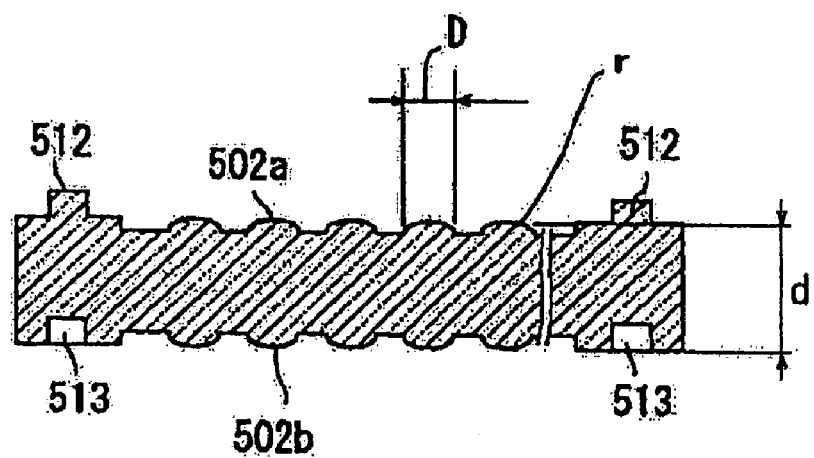
FIG. 23B is an expanded side view of the planar-shaped lens array plate shown in FIG. 23A.

Moreover, the position of the connecting portion is not limited to the identical position, while the position of the connecting portion of each of the stacked planar-shaped lens array plates shown in FIG. 18 and FIG. 19 is provided as the identical position. On the other hand, the position of the connecting portion of each of the stacked planar-shaped lens array plates may be provided to be the identical position by providing the conical convex portions 512 and the concave portions 513 for combining which are shown in FIG. 23B according to the need of an image reading apparatus or an image writing apparatus.

Then, an image reading apparatus using a lengthy lens array plate of an erecting unit magnification system according to the present invention is described.

(Image Reading Apparatus)

Figure 20:
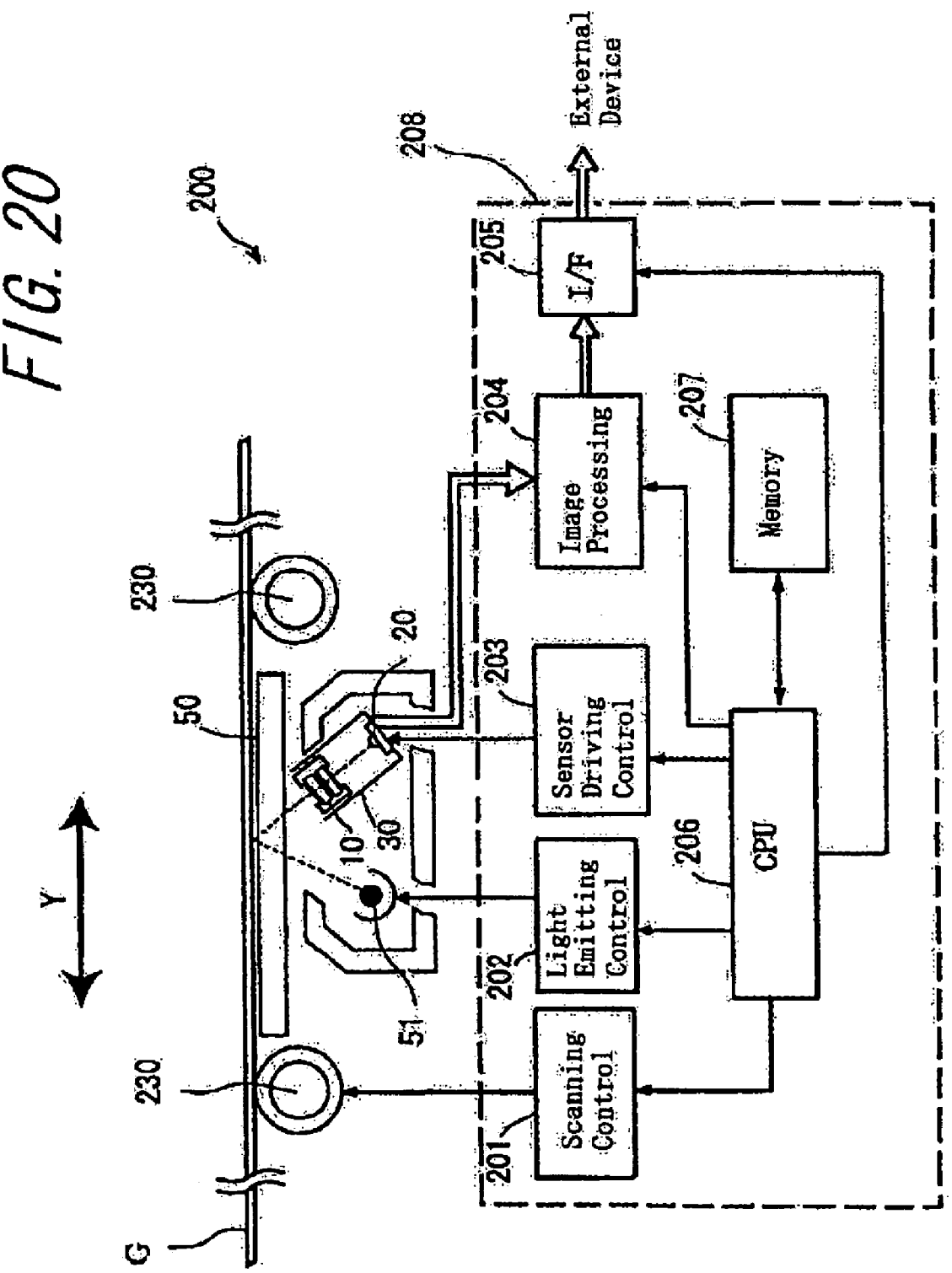
FIG. 20 is a schematic diagram of an image reading apparatus using the optical system that comprise a lengthy planar-shaped lens array plate in any one of the first to sixth embodiments in accordance with the present invention.

FIG. 20 is a schematic diagram of an image reading apparatus using the optical system that comprises the lengthy lens array plate in any one of the first to sixth embodiments in accordance with the present invention. An image scanner 200 as the image reading apparatus comprises an image sensor 30 for reading the image information of an original by the reflected light from the original G putted on an original glass plate 50, the original being irradiated by light; a driving source 230 for scanning the original; and a controller circuit 208 for controlling the image scanner.

The controller circuit 208 comprises a scanning control unit 201 for controlling the driving of the driving source 230; a light-emitting control unit 202 for controlling the light emission of a linear illuminating device 51; a sensor driving control unit 203 for controlling a processing portion of the image sensor that receives the irradiated light from the original G by means of the light-receiving array provided on the image sensor substrate 20 in the image sensor 30 to perform the photo-electric conversion; an image processing unit 204 for processing the image information after the photo-electric conversion that is obtained from the sensor driving control unit 203; an interface unit 205 for outputting the image information after image processing into an external device etc.; a memory unit 207 for storing program required for the image processing, the interface, and several controls; and a central processing unit (CPU) 206 for controlling the scanning control unit 201, the light-emitting control unit 202; the sensor driving control unit 203, the image processing unit 204, the interface unit 205 and the memory unit 207.

The image sensor 30 comprises the lengthy lens array plate 10 in accordance with the present invention. In the image scanner 200, an electric signal (analog signal) after the photoelectric conversion of the reflected light from the original G is obtained by the control of the sensor driving control unit 203. The analog signal is converted to a digital image signal by means of A/D converter provided in the image-processing unit 204. The converted digital image signal is output into the external device through the interface unit 205 after executing the correction processing, such as the correction of the signal level, the image information position, and the interpolation between plural pixels, by means of a correction circuit provided in the image processing unit 204. In addition, the image-processing unit 204 may comprise an image processing stage for digital recording (not shown), and thereby these techniques may be applied to an image writing apparatus including a photo-sensitive dram by providing an image processing suitable to the writing process into the photo-sensitive dram.

The image information of the original may be read by scanning the image sensor 30 with respect to the fixed original G in the sub scanning direction (the depicted Y direction), while the image information of the original can be read by scanning the original G itself with respect to the fixed image sensor 30 in the image reading apparatus shown in FIG. 20.

Then, an image writing apparatus using a lengthy lens array plate of an erecting unit magnification system according to the present invention is described.

(Image Writing Apparatus)

Figure 21:
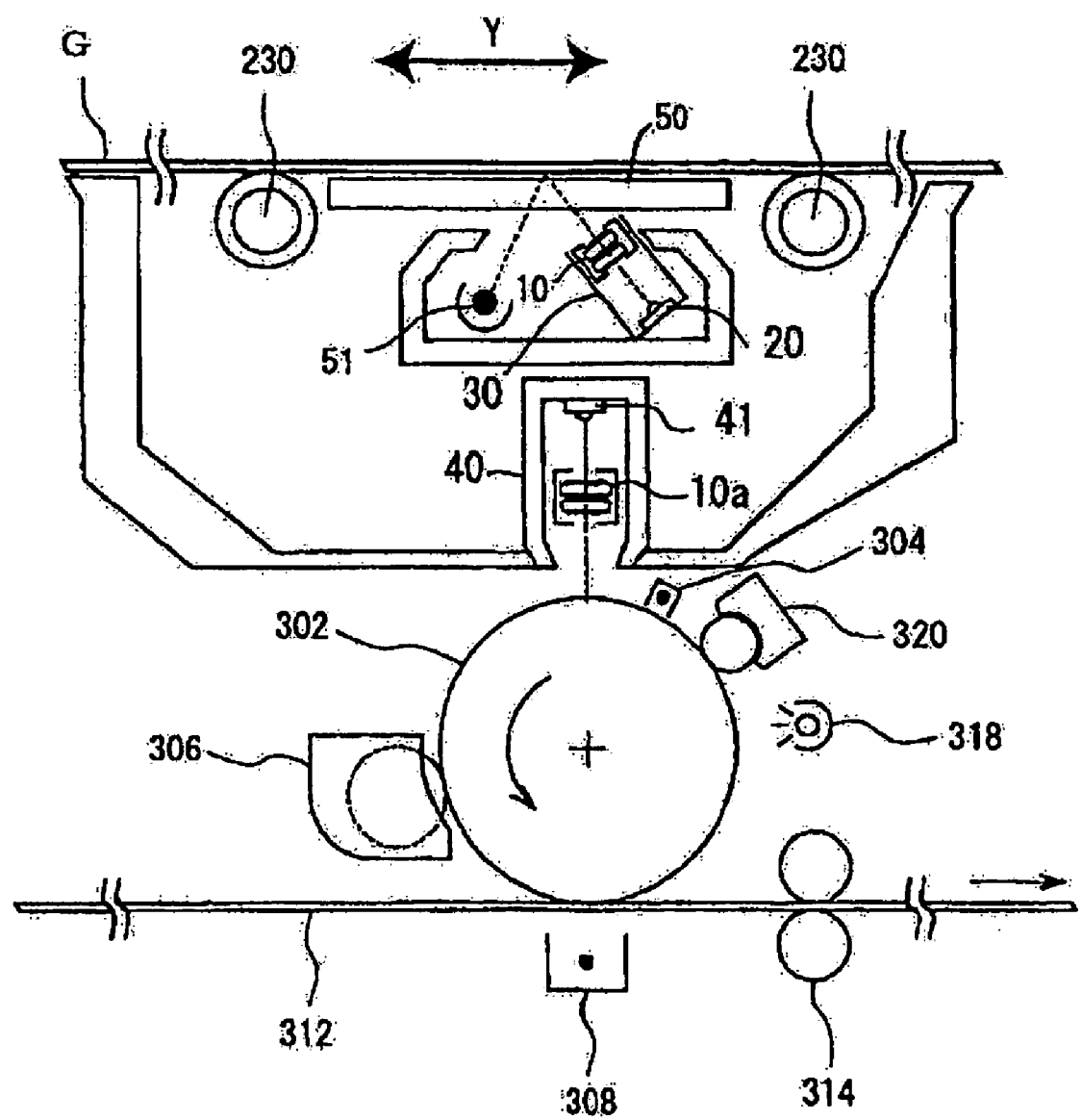
FIG. 21 is a schematic diagram of one electro-photographic apparatus of an image writing apparatus using a lengthy lens array plate of an erecting unit magnification system in accordance with the present invention.
Figure 22A:
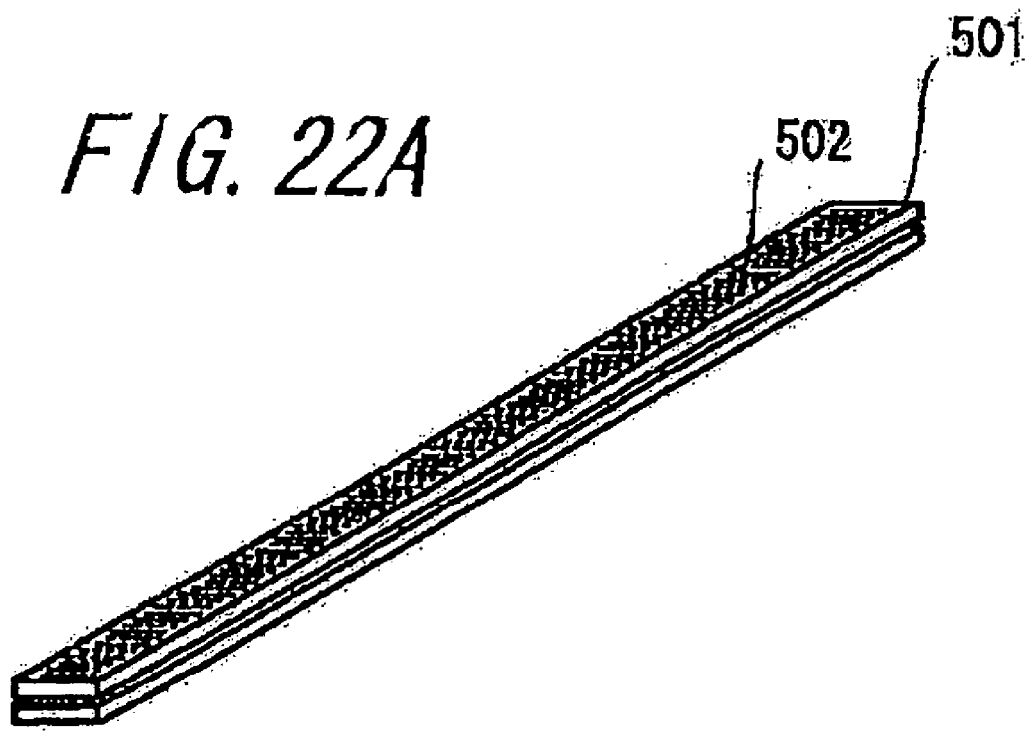
FIG. 22A is a perspective view showing an example of a lens array plate of an erecting unit magnification system in which the lens array plate is arranged by stacking two lens array plates so that the optical axis of the lens portion of each lens array plate at the upper and lower is coaxial.
Figure 22B:
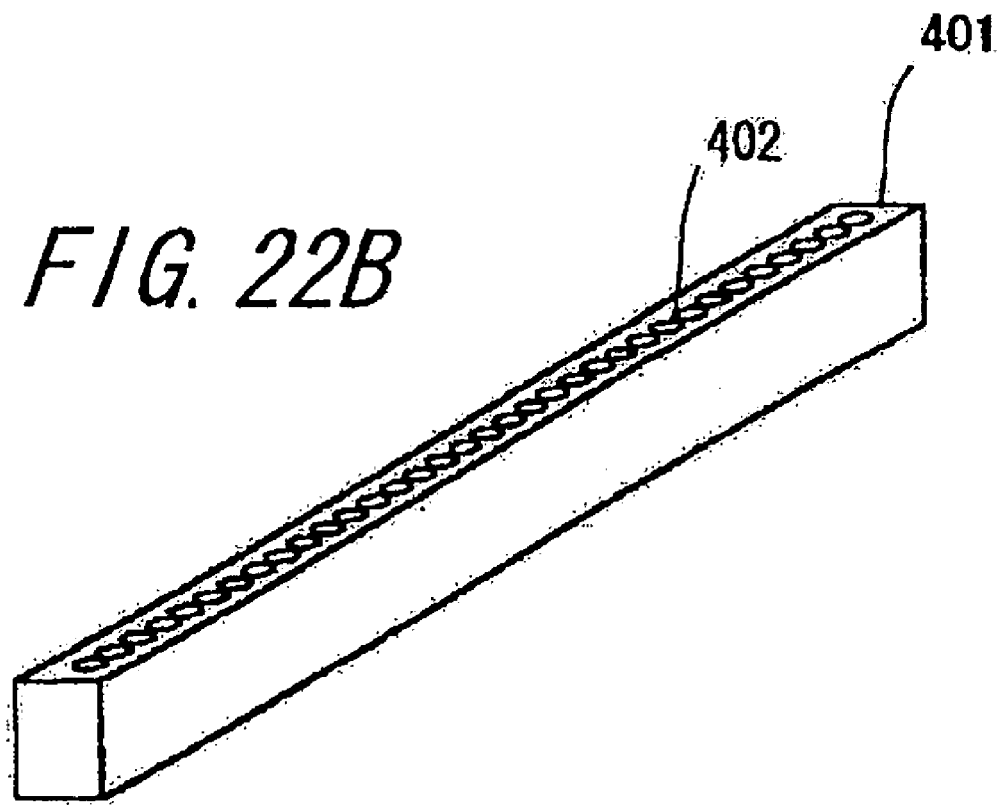
FIG. 22B is a perspective view showing an example of a rod-lens array that is provided as a lens array of the erecting unit magnification system.

FIG. 21 is a schematic diagram of one electro-photographic apparatus of an image writing apparatus using the lengthy lens array plate of an erecting unit magnification system in accordance with the present invention. The elements, which are identical with respect to FIG. 20, are designated by the same reference signs, and the simpler description of them is omitted.

In the electro-photographic apparatus shown in FIG. 21, the light of the light-emitting element array 41 in a optical writing head 40 is emitted based on the image information from the image sensor, and irradiated into the photo-sensitive dram 302. A light-conductive material (photosensitive material), such as amorphous Si, is formed on the surface of the cylindrical photosensitive drum 302. This cylindrical photosensitive drum 302 rotates at the printing speed. The whole surface of the cylindrical photosensitive drum 102 is evenly charged by means of a charging device 304 while rotating. Then, the light corresponding to the dot images for printing is irradiated onto the photosensitive material by means of the optical writing head 40, and charged portions of the photosensitive material are neutralized by means of the irradiated light. Then, the toner is continuously applied on the photosensitive material with a developing device 306, depending on the state of the charge on the photosensitive material. Then, the toner is transferred on a transported paper 312 by a transfer device 308. The transported paper 312 is heated and fixed with an electro-photographic fixing device 314, and finally the image information of the original G is copied onto the transported paper 312. On the other hand, after the transfer is ended, the charged portions of the photosensitive material are neutralized over the entire surface of the cylindrical photosensitive drum 302 by means of an erasing lamp 318, and the remaining toner on the cylindrical photosensitive drum 302 is removed by means of a cleaning device 320.

While the electro-photographic apparatus has been described in FIG. 21, the structure of the apparatus is substantially similar to a facsimile or a multi-function apparatus, such as a multi-function printer.

The lens array plate of the erecting unit magnification system comprising the lengthy planar-shaped lens array plate 10 or 10a described in FIG. 20 or FIG. 21 may be implemented by using any one of the lens array plates of an erecting unit magnification system described in the first to sixth embodiments. However, it should be noticed that the lens array plate of an erecting unit magnification system could be implemented as another aspect of a lengthy planar-shaped lens array plate by stacking the three or more planar-shaped lens array plates rather than two planar-shaped lens array plates, as the stacked planar-shaped lens array plate with not only two but also three or more sheets. In addition, while the image reading apparatus and the image writing apparatus have been described based on the lengthy lens array plate of an erecting unit magnification system in the first to sixth embodiments, the image reading apparatus and the image writing apparatus may be implemented by using the structure of the seventh embodiment.

It should be understood that a lot of variations and modifications is able to be implemented by the skilled person in the art in the spirit or scope of the present invention, while the specific examples are described in the above-described embodiments. For example, the function of the connecting portion may be applied to not only the longer direction of the planar-shaped lens array plate but the shorter direction thereof. Thus, according to the combination thereof, the large area type of the planar-shaped lens array plate with large area may be formed to implement the longer or larger area type of the planar-shaped lens array plate. Accordingly, the present invention is not to be considered as limited by the foregoing description but is only limited by the scope of the appended claims.

In accordance with the present invention, a longer or larger area type of a planar-shaped lens array plate that has lower deterioration of the optical performance may be provided with low-cost. Thereby, the present invention is useful for an image reading apparatus using a contact image sensor with a lens array plate of an erecting unit magnification system that includes an image scanner, a facsimile, an electro-photographic apparatus, or multi-function apparatus including a multi-function printer etc.; or an image writing apparatus using a light-writing head with a lens array plate of an erecting unit magnification system.

The invention claimed is:

1. A lengthy lens array plate of an erecting unit magnification system, comprising:
    a plurality of planar-shaped lens array plates, each planar-shaped lens array plate including a plurality of lens portions arranged regularly on a plate surface thereof,
    wherein the planar-shaped lens array plates are connected to each other at least one lateral surface of each planar-shaped lens array plate, and
    wherein the at least one lateral surface connecting the planar-shaped lens array plates has a planar surface such that a substantially linear connecting portion appears on the plate surface, wherein said linear connecting portion does not intersect with any of the lens portions.

2. The lengthy lens array plate of an erecting unit magnification system according to claim 1, wherein each of the plurality of planar-shaped lens array plates has the linear connecting portion at the identical position thereof.

3. The lengthy lens array plate of an erecting unit magnification system according to claim 1, wherein the magnitude of the focusing amount of light at the connecting portion, which is defined as the magnitude of the amount of light focused in accordance with the distance between both sides of lens portions adjacent to the connecting portion, is larger than the magnitude of the focusing amount of light at the position other than the connecting portion.

4. The lengthy lens array plate of an erecting unit magnification system according to claim 1, wherein the distance between connected lens arrangement lines, X, is equal to or less than the distance between lens arrangement lines, P; in which the distance between connected lens arrangement lines, X, means the distance between the lens arrangement lines being substantially parallel, nearest lens arrangement lines with respect to the connecting portion, and the distance between lens arrangement lines, P, means the distance between the lens arrangement lines being substantially parallel lens arrangement lines with respect to the connecting portion, in which the connecting portion does not exist therebetween.

5. The lengthy lens array plate of an erecting unit magnification system according to claim 4, wherein the distance between connected lens arrangement lines, X, meets the condition of $D<X\leq P$ where the D is the diameter of the lens portion.

6. The lengthy lens array plate of an erecting unit magnification system according to claim 1, wherein the arrangement of the plurality of lens portions is formed with hexagonal array.

7. The lengthy lens array plate of an erecting unit magnification system according to claim 1, wherein the connecting angle θs forming the connecting portion is an angle nearest to 90° with respect to the main-scanning direction of the planar-shaped lens array plate within the angles of selectable lens arrangement lines in the planar-shaped lens array plate.

8. The lengthy lens array plate of an erecting unit magnification system according to claim 7, wherein the connecting angle θs forming the connecting portion is less than 90°.

9. An image reading apparatus, comprising:
    an light source for irradiating light into an original putted on an original glass plate;
    a plurality of light-receiving element lines for receiving the reflected light from the irradiated original to read the image information of the original; and
    an erecting unit magnification lens for focusing the image information of the original on the plurality of light-receiving element lines,
    wherein the erecting unit magnification lens comprises said lengthy lens array plate of an erecting unit magnification system according to claim 1.

10. An image reading apparatus, comprising:
    an light source for irradiating light into an original putted on an original glass plate;
    a plurality of light-receiving element lines for receiving the reflected light from the irradiated original to read the image information of the original;
    an erecting unit magnification lens for focusing the image information of the original on the plurality of light-receiving element lines; and a controller circuit including an image processing unit for controlling the reading of the image information and obtaining the image information to execute the predefined image-processing, wherein the overlap portion of light-receiving element lines consisting of at least two light-receiving element lines within the plurality of light-receiving element lines has, at least in part, the function used for multiplexing and receiving the image information that corresponds to the connecting portion, and the erecting unit magnification lens comprises said lengthy lens array plate of an erecting unit magnification system according to claim 1.

11. The image reading apparatus according to claim 10, wherein the predefined image-processing selectively processes the image information obtained from each light-receiving element provided for the overlap portion of light-receiving element lines.

12. The image reading apparatus according to claim 10, wherein the predefined image-processing processes the weighted value to be added of the image information obtained from each light-receiving element provided for the overlap portion of light-receiving element lines.

13. An image writing apparatus, comprising:

a plurality of light-emitting element lines, each of the plurality of light-emitting element lines having comprising a plurality of light-emitting elements;

a photo-sensitive dram for entering the image information by the emitted light from the light-emitting elements; and an erecting unit magnification lens for focusing the emitted light from the light-emitting element lines on the photo-sensitive dram, wherein the erecting unit magnification lens comprises said lengthy lens array plate of an erecting unit magnification system according to claim 1.

14. An image writing apparatus, comprising:

a plurality of light-emitting element lines, each of the plurality of light-emitting element lines having comprising a plurality of light-emitting elements;

a photo-sensitive dram for entering the image information by the emitted light from the light-emitting elements;

an erecting unit magnification lens for focusing the emitted light from the light-emitting element lines on the photo-sensitive dram; and a controller circuit including an image processing unit for obtaining the image information to execute the predefined image-processing and control the entering of image information with respect to the photo-sensitive dram, wherein the overlap portion of light-emitting element lines consisting of at least two light-emitting element lines within the plurality of light-emitting element lines has, at least in part, the function for multiplexing and writing the image information that corresponds to the connecting portion, and the erecting unit magnification lens comprises said lengthy lens array plate of an erecting unit magnification system according to claim 1.

15. The image writing apparatus according to claim 14, wherein the predefined image-processing selectively processes the image information obtained from each light-emitting element provided for the overlap portion of light-emitting element lines.

16. The image writing apparatus according to claim 14, wherein the predefined image-processing processes the weighted value to be added of the image information obtained from each light-emitting element provided for the overlap portion of light-emitting element lines.

17. A method for manufacturing the lengthy erecting unit magnification lens array, the method comprising the steps of:

(a) forming each of a plurality of planar-shaped lens array plates, each planar-shaped lens array plate including a plurality of lens portions arranged regularly on a plate surface of thereof; and (b) connecting each of the plurality of planar-shaped lens array plates obtained in the step (a) in a longitudinal direction at least at one lateral surface of the planar-shaped lens array plate thereof, wherein the connecting portion connected in the step (b) is substantially linear on the plate surface, the linear connecting portion does not intersect with any of the lens portions.

18. A lengthy lens array plate of an erecting unit magnification system according to claim 1, wherein the regular arrangement of the lens portions is kept in the peripheral area of the connecting portion.

* * * * *

UNITED STATES PATENT AND TRADEMARK OFFICE
CERTIFICATE OF CORRECTION

| | | Page 1 of 1 |
|---|---|---|
| PATENT NO. | : 8,270,085 B2 | |
| APPLICATION NO. | : 12/374268 | |
| DATED | : September 18, 2012 | |
| INVENTOR(S) | : Hashimoto et al. | |

It is certified that error appears in the above-identified patent and that said Letters Patent is hereby corrected as shown below:

In the Specifications

In column 12 at line 55, Change "0.35-" to --0.35+--.

In the Claims

In column 19 at line 61, In Claim 1, after "other" insert --at--.

In column 19 at line 62, In Claim 1, after "plate", and before "and" insert --to extend the length of the planar-shaped lens array plate shaped as a monolayer--.

In column 22 at line 34, In Claim 17, after "thereof", insert --extending the length of the planar-shaped lens array plate shaped as a monolayer--.

Signed and Sealed this
Twenty-fifth Day of March, 2014

Michelle K. Lee
*Deputy Director of the United States Patent and Trademark Office*